(12) United States Patent (10) Patent No.: US 12,130,228 B2
Foley et al. (45) Date of Patent: Oct. 29, 2024

(54) SUPER-RESOLUTION THERMOREFLECTANCE THERMAL MEASUREMENT SYSTEM

(71) Applicant: The Penn State Research Foundation, University Park, PA (US)

(72) Inventors: Brian M. Foley, Philadelphia, PA (US); Devon A. Eichfeld, Drums, PA (US)

(73) Assignee: The Penn State Research Foundation, University Park, PA (US)

(*) Notice: Subject to any disclaimer, the term of this patent is extended or adjusted under 35 U.S.C. 154(b) by 202 days.

(21) Appl. No.: 17/964,519

(22) Filed: Oct. 12, 2022

(65) Prior Publication Data

US 2024/0125692 A1 Apr. 18, 2024

Related U.S. Application Data

(60) Provisional application No. 63/347,787, filed on Jun. 1, 2022.

(51) Int. Cl.
*G01N 21/17* (2006.01)
*G01N 21/55* (2014.01)

(52) U.S. Cl.
CPC ......... *G01N 21/1717* (2013.01); *G01N 21/55* (2013.01); *G01N 2021/1731* (2013.01); *G01N 2201/06113* (2013.01)

(58) Field of Classification Search
CPC ........... G01N 11/16; G01N 2291/0256; G01N 9/002; G01N 2291/02818;
(Continued)

(56) References Cited

U.S. PATENT DOCUMENTS 7,719,663 B2 * 5/2010 Kawakatsu ............ G01Q 20/02
250/306
10,228,388 B2 * 3/2019 Prater .................... G01Q 60/34
(Continued)

FOREIGN PATENT DOCUMENTS

FR 3085756 A1 * 3/2020 ......... G01N 21/3563
TW 201809676 A * 3/2018 ............ G01Q 70/04
(Continued)

OTHER PUBLICATIONS

Braun et al., "A steady-state thermoreflectance method to measure thermal conductivity", Review of Scientific Instruments, Feb. 28, 2019, AIP Publishing, https://doi.org/10.1063/1.5056182.
(Continued)

*Primary Examiner* — Michael P Stafira
(74) *Attorney, Agent, or Firm* — Dinsmore & Shohl LLP

(57) ABSTRACT

A system and method for performing nanoscale thermal property characterization of materials. The system combines the operating principles of thermoreflectance-based techniques and scanning probe microscopy techniques into a hybrid solution capable of deriving thermophysical properties of a sample. A pump laser beam heats a distal end of a cantilever, and a probe laser beam is reflected off of a specular surface at the distal end of the cantilever carrying with it thermoreflectance data that can be used to extract thermophysical properties of the sample region adjacent to a tip suspended at the distal end of the cantilever.

20 Claims, 8 Drawing Sheets

(58) Field of Classification Search
CPC ......... G01N 2291/0427; G01N 29/022; G01N 29/036; G01N 25/18; G01N 33/54366; G01N 1/04; G01N 15/1456; G01N 21/62; G01N 25/20; G01N 25/4833; G01N 29/326; G01N 29/46; G01N 15/1023; G01N 15/14; G01N 2021/1731; G01N 21/1717; G01N 2291/021; G01N 2291/2697; G01N 33/54373; G01N 11/10; G01N 2009/006; G01N 25/4813; G01N 25/4826; G01N 27/745; G01N 29/041; G01N 29/2418; G01N 29/346; G01N 29/348; G01N 29/4409; G01N 33/5434; G01N 2223/6116; G01N 2223/652; G01N 23/2252; G01N 23/2273; G01N 25/482; G01N 25/486; G01N 25/72; G01N 29/30; G01N 29/343; G01N 5/00; G01N 5/04; G01N 1/40; G01N 1/44; G01N 2001/4038; G01N 2021/258; G01N 21/171; G01N 21/3504; G01N 21/39; G01N 21/55; G01N 21/553; G01N 21/554; G01N 21/63; G01N 21/658; G01N 2201/06113; G01N 2203/028; G01N 2291/02845; G01N 25/005; G01N 25/22; G01N 25/4866; G01N 27/129; G01N 27/18; G01N 27/447; G01N 27/44721; G01N 27/4473; G01N 27/44791; G01N 27/61; G01N 29/22; G01N 3/08; G01N 31/223; G01N 33/0031; G01N 33/225; G01N 33/2823; G01N 33/569; G01N 9/36

See application file for complete search history.

(56) References Cited

U.S. PATENT DOCUMENTS

| | | | |
|---|---|---|---|
| 10,481,174 B2 | 11/2019 | Zeldov et al. | |
| 11,162,978 B2 | 11/2021 | Zhu et al. | |
| 2015/0110150 A1 | 4/2015 | Schmidt | |
| 2015/0253248 A1* | 9/2015 | Wickramasinghe | G01J 3/453 356/301 |
| 2018/0052186 A1* | 2/2018 | Su | G01N 21/35 |
| 2019/0324054 A1* | 10/2019 | Labuda | G01Q 20/02 |
| 2021/0072282 A1 | 3/2021 | Chinivaranahalli Shastry et al. | |
| 2021/0072283 A1* | 3/2021 | Sharar | G01Q 60/38 |
| 2022/0146443 A1 | 5/2022 | Braun et al. | |

FOREIGN PATENT DOCUMENTS

| | | | | |
|---|---|---|---|---|
| WO | WO-2008122800 A1 | * | 10/2008 | ............. B82Y 20/00 |
| WO | WO-2012137491 A1 | * | 10/2012 | ............. B82Y 15/00 |
| WO | WO-2013003864 A1 | * | 1/2013 | ............. G01N 21/65 |
| WO | WO-2021148632 A1 | * | 7/2021 | |

OTHER PUBLICATIONS

Briggs et al., "Epitaxial graphene/silicon carbide intercalation: a minireview on graphene modulation and unique 2D materials", Jul. 31, 2019, Nanoscale, DOI: 10.1039/c9nr03721g.

Butt et al., "Force measurments with atomic force microscope: Technique, interpretation and applications", Aug. 1, 2005, Elsevier B.V., doi:10.1016/f.surfrep.2005.08.003.

Cahill, "Analysis of heat flow in layered structures for time-domain thermoreflectance", Review of Scientific Instruments, Nov. 10, 2004, AIP Publishing, https://doi.org/10.1063/1.1819431.

Cahill et al., "Thermometry and Thermal Transport in Micro/Nanoscale Solid-State Devices and Structures", Apr. 2022, Journal of Heat Transfer, DOI: 10.1115/1.1454111.

Zhu et al., "Realizing the nanoscale quantitative thermal mapping of scanning thermal microscopy by resilient tip-surface contact resistance models", Apr. 24, 2018, Nanoscale, DOI: 10.1039/c8nh00043c.

Regner et al., "Advances in Studying Phonon Mean Free Path Dependent Contributions to Thermal Conductivity", Aug. 20, 2015, Nanoscale and Microscale Thermophysical Engineering, 19:3, 183-205, DOI: 10.1080/15567265.2015.1045640.

Rodriguez et al., "Dual-frequency resonance-tracking atomic force microscopy", Oct. 19, 2007, Nanotechnology, IOP Publishing, doi:10.1088/0957-4484/18/47/475504.

Schmidt et al., "Pulse accumulation, radial heat conduction, and anisotropic thermal conductivity in pump-probe transient thermoreflectance", Nov. 11, 2008, American Institute of Physics, DOI: 10.1063/1.3006335.

Schmidt et al., "A frequency-domain thermoreflectance method for the characterization of thermal properties", Sep. 1, 2009, Review of Scientific Instruments, AIP Publishing, https://doi.org/10.1063/1.3212673.

Sharahi et al., "Acoustic subsurface-atomic force microscopy: Three-dimensional imaging at the nanoscale", Jan. 14, 2021, Journal of Applied Physics, https://doi.org/10.1063/5.0035151.

Wickramasinghe, "Scanned Probes Old and New", May 29, 2008, AIP Conference Proceedings, https://doi.org/10.1063/1.41408.

Wilson et al., "Anisotropic failure of Fourier theory in time-domain thermoreflectance experiments", Oct. 1, 2014, Nature Communications, DOI: 10.1038/ncomms6075.

Zhang et al., "A Review on Principles and Applications of Scanning Thermal Microscopy (SThM)", 2019. Advanced Functional Materials, DOI: 10.1002/adfm.201900892.

Zhou et al., "Thermal Conductivity of Amorphous Materials", 2020. Advanced Functional Materials, DOI: 10.1002/adfm.201903829.

* cited by examiner

| Material: | CaF$_2$ (Bulk) | SiO$_2$ Grown on Si (Thin-film, Amorphous) | N-doped Silicon (Bulk) | Al$_2$O$_3$ Metalattice (60nm Radii Spheres of SiO$_2$) | Cold-sintered Ceramic |
|---|---|---|---|---|---|
| Scan Range | 2.0 x 2.0 μm$^2$ | 1.0 x 1.0 μm$^2$ | 1.5 x 1.5 μm$^2$ | 600 x 600 nm$^2$ | 550 x 550 nm$^2$ |
| Resolution | 100 x 100 px$^2$ | 100 x 100 px$^2$ | 100 x 100 px$^2$ | 100 x 100 px$^2$ | 100 x 100 px$^2$ |
| AFM Probe (Radius) | SiN Pyramid Tip (10 nm) | Diamond-Like Carbon Sphere Tip (300 nm) | Diamond-Like Carbon Sphere Tip (300 nm) | SiN Pyramid Tip (10 nm) | SiN Pyramid Tip (10 nm) |
| Pump Frequency | 60 kHz (Near Resonance) | 76.40 kHz (Near Resonance) | 76.45 kHz (Near Resonance) | 3 kHz (Off-Resonance) | 1 kHz (Off-Resonance) |
| Post-Processed Topography | | | | | |
| Thermo-reflectance Data (Magnitude or Phase) | | | | | |

FIG. 10

SUPER-RESOLUTION THERMOREFLECTANCE THERMAL MEASUREMENT SYSTEM

REFERENCES TO RELATED APPLICATIONS

This application claims the benefit of U.S. Provisional Patent Application Ser. No. 63/347,787 filed Jun. 1, 2022, the entire contents of which are incorporated herein by reference.

FIELD OF THE INVENTION

This disclosure relates to a system and method for the nanoscale thermal characterization of materials.

BACKGROUND OF THE INVENTION

In recent history, the rapid development of novel materials combined with advancements in deposition and fabrication processes have yielded electronic devices that are continually surpassing size-limitations of previous generations. As electronic devices decrease in size, the importance of understanding the thermal properties at these small length scales, e.g., micro-to-nano length scales, has become crucial to further progress in the areas of materials modelling, material synthesis, and improved device design. However, current state-of-the-art techniques for characterizing the thermal properties at such small length scales suffer from short comings that limit widespread adoption of these techniques.

With regards to sensitivity and spatial resolution, the dominant state-of-the-art techniques are (i) thermoreflectance-based techniques and (ii) scanning thermal microscopy (SThM), respectively. The operating principles, benefits, and shortcomings of each of these techniques vary significantly.

Thermoreflectance-Based Techniques

Since the early 2000s, optical pump-probe techniques have led the charge in furthering our understanding of heat flow in samples with smaller characteristic length/size scales, such as thin-films. These techniques rely on lasers to pump (heat) and probe (measure) temperature changes in the sample using a material property called thermoreflectance, which is the change in a material's reflectivity with respect to temperature at a given wavelength of light. The thermoreflectance signal is small (on the order of $\sim 10^{-4}$ $K^{-1}$), but with frequency modulation of the pump heating event (using pulsed or continuous-wave lasers) and phase-sensitive detection schemes, the thermoreflectance signal can be extracted from the full reflected probe beam, despite the potential presence of any coherent (narrow-band) and incoherent (broadband) noise sources also present in the signal. See D. G. Cahill, K. Goodson, and A. Majumdar, "Thermometry and Thermal Transport in Micro/Nanoscale Solid-State Devices and Structures," J Heat Transf, vol. 124, no. 2, pp. 223-241, 2002, doi: 10.1115/1.1454111. These techniques are considered non-destructive, but they typically require a thin metal film to be deposited on the sample to act as an opto-thermal transducer layer (common materials are Al, Au, or Pt; typically 80-100 nm thick). The transducer acts as a heater (by absorbing the energy from the pump beam and sourcing a heat flux to conduct through the sample of interest from its top-most surface), and as a thermometer, by providing a specular surface for the probe beam to reflect off of and be modulated by changes in the thermoreflectance of the transducer. Common thermoreflectance based, optical pump-probe experiments include Time-Domain Thermoreflectance (TDTR), Frequency-Domain Thermoreflectance (FDTR), and Steady-State Thermoreflectance (SSTR).

In TDTR, a pulsed laser source is used as both a pump and a probe, with a delay stage in either the pump or probe beam path to temporally separate the arrival of the pump and probe pulses on the sample. The pump is amplitude-modulated at a set frequency with an electro-optic modulator so that lock-in detection can extract the thermoreflectance of the reflected probe beam, and the time delay allows the time-evolution of heat flow through the system to be observed. Cahill and Schmidt et al. show how TDTR data may be fitted to a multilayer, time-domain thermal model of the material system and the time-delay response of the thermoreflectance data to extract thermal properties. D. G. Cahill, "Analysis of heat flow in layered structures for time-domain thermoreflectance," Rev. Sci. Instrum., vol. 75, no. 12, pp. 5119-5122, 2004, doi: 10.1063/1.1819431; A. J. Schmidt, X. Chen, and G. Chen, "Pulse accumulation, radial heat conduction, and anisotropic thermal conductivity in pump-probe transient thermoreflectance," Rev. Sci. Instrum., vol. 79, no. 11, p. 114902, 2008, doi: 10.1063/1.3006335.

In FDTR, either pulsed or continuous-wave (CW) lasers are used for the pump and probe, and the modulation frequency of the pump laser amplitude is varied to characterize the frequency-dependent flow of heat from the top surface down into the sample under test. Schmidt et al. explains how the frequency-dependent data may then be fitted to a multilayer, frequency-domain thermal model of the sample to examine the sensitivity at different modulation frequencies and extract thermal properties. A. J. Schmidt, R. Cheaito, and M. Chiesa, "A frequency-domain thermoreflectance method for the characterization of thermal properties," Rev. Sci. Instrum., vol. 80, no. 9, p. 094901, 2009, doi: http://dx.doi.org/10.1063/1.3212673.

In SSTR, CW lasers are typically used, and the pump power is varied slightly to induce a linear variation in temperature, measured via thermoreflectance. As explained in Braun et al., a fitting parameter, y, is determined by measuring the signal on a calibration sample with a known thermal conductivity, and this parameter is then used to scale subsequent data collected from additional samples and enable characterization of various thermophysical parameters of interest (thermal conductivity, thermal boundary conductance, etc.). J. L. Braun, D. H. Olson, J. T. Gaskins, and P. E. Hopkins, "A steady-state thermoreflectance method to measure thermal conductivity," Rev. Sci. Instrum., vol. 90, no. 2, p. 024905, February 2019, doi: 10.1063/1.5056182.

Each of the above thermoreflectance-based techniques face similar pitfalls when trying to push the envelope of the minimum-resolvable lateral resolution by shrinking the measurement volume. For instance, each technique is diffraction-limited, meaning that the minimum lateral dimension (and thus the minimum resolution) that can be probed are limited to the minimum focusable spot size of the laser beams (in practice, typically on the order of a few micrometers).

Furthermore, while the required metal transducer layer facilitates the opto-thermal energy conversion and temperature detection processes, simplifies the thermal modelling, and allows the thermal characterization of a wide range of materials, studies have also shown that it may invalidate or limit the ability of the aforementioned experiments to probe and understand truly the nanoscale thermal transport physics both across the transducer/sample interface and within the sample material immediately adjacent to the interface. K. T. Regner, J. P. Freedman, and J. A. Malen, "Advances in Studying Phonon Mean Free Path Dependent Contributions to Thermal Conductivity," *Nanoscale Microscale Thermophys. Eng.*, vol. 19, no. 3, pp. 183-205, July 2015, doi: 10.1080/15567265.2015.1045640; R. B. Wilson and D. G. Cahill, "Anisotropic failure of Fourier theory in time-domain thermoreflectance experiments," *Nat Commun*, vol. 5, 10/01/online 2014, [Online]. Available: http://dx.doi.org/10.1038/ncomms6075.

Scanning Probe Techniques & Scanning Thermal Microscopy (SThM)

When trying to achieve smaller spatial resolution for an experimental technique, one may intuitively look toward the world of scanning probe microscopy (SPM). As a class of metrology, SPM techniques encompass several methods such as scanning tunneling microscopy (STM) and atomic force microscopy (AFM), which have had a significant impact on materials characterization and discovery. These systems have enabled the collection of 2D (and sometimes 3D) image data related to property variations in material structures, even down to the atomic level.

Under the AFM branch of SPM, a sample is typically scanned via raster line-scans by a probe. This data is collected, and a two-dimensional (2D) map of the surface properties in the scanned region is created. AFMs typically utilize a probe that consists of a sharp tip (typically ~5-1000 nm in radius) that is suspended at the end of a long rectangular cantilever (typically ~100-450 µm long by ~50 µm wide). Typically (though not always), AFM probes have a thin metal coating on the cantilever to act as a reflecting mirror for different control schemes. AFM probes often have specifically designed mechanical properties, such as natural resonant frequencies or spring constants that are useful in specific techniques and in performing force calculations. Specialized AFM probes may have very specific mechanical properties, integrated electronic components and traces, or unique cantilever and tip geometries to perform nanoindentation, mechanical and electrical property measurements, or measurements on biological samples.

AFM platforms operate in either contact or non-contact mode. "Constant force" mode is a common contact mode where a positioning laser beam is focused onto and reflected off of the AFM cantilever at non-normal incidence. The reflection of the positioning laser is focused onto a position-sensitive detector (PSD), enabling the deflection of the cantilever to be monitored. By setting the signal on the PSD with an initial offset, the deflection of the cantilever can be tracked and held constant by adjusting the height of the stage to maintain a constant force on the sample. The sample stage is piezoelectrically actuated, allowing full stage control through software and PID control feedback loops. During an AFM raster scan, the stage will move laterally (in X and Y) and use a feedback loop to adjust the height (Z) to maintain the constant set force/deflection on the probe at each point. At each coordinate, or "pixel," the stage height is recorded, which can be used to construct a 2D colormap of the sample's topography in the scan region. In non-contact modes, the AFM tip does not necessarily make contact with the sample, and the control schemes may be more complicated. Non-contact modes often rely on resonant modes of the AFM probe, and they may use a piezo-actuated AFM probe to easily induce dynamic motion of and frequency modulation in the cantilever. B. J. Rodriguez, C. Callahan, S. V. Kalinin, and R. Proksch, "Dual-frequency resonance-tracking atomic force microscopy," *Nanotechnology*, vol. 18, no. 47, p. 475504, October 2007, doi: 10.1088/0957-4484/18/47/475504.

There are many daughter systems of the AFM that have enabled material property measurement at the micro-to-nano length scales simultaneously with a topography scan utilizing specialized probes, including mechanical, electrical, magnetic, thermal, and chemical measurements through the AFM formfactor. Some notable systems/techniques include Scanning Near-field Optical Microscope (SNOM), Scanning Microwave Impedance Microscopy (SMIM), Scanning Spreading Resistance Microscopy (SSRM), Kelvin Force Probe Microscopy (KPFM), Contact Resonance Microscopy (CRM), and Scanning Thermal Microscopy (SThM). As a means to understand thermal properties at the nanoscale, SThM has served as the primary approach thus far.

SThM is a contact mode of AFM utilizing an electrothermal approach to cantilever heating and temperature measurement that has been developed over many years, starting in the 1980s with the relatively simple idea of depositing heat near the tip of a custom fabricated AFM probe, e.g., via Joule heating, combined with the subsequent detection of temperature rise in the tip via either a change in the resistivity of an integrated resistive element or the generated thermovoltage from an integrated thermocouple, both dictated by the fraction of the deposited heat flux that flows through the tip to the sample and enabling spatially-resolved thermal measurements down to hundreds of nanometers. H. K. Wickramasinghe, "Scanned Probes Old and New," *AIP Conf. Proc.*, vol. 241, no. 1, pp. 9-22, December 1991, doi: 10.1063/1.41408. Throughout the years, various advancements have expanded the utility of SThM, including developments with different probe tips and thermal modes. Most SThM probes utilize electrical resistance or thermoelectric properties to measure the temperature of the sample at the point of contact. Y. Zhang, W. Zhu, F. Hui, M. Lanza, T. Borca—Tasciuc, and M. Munoz Rojo, "A Review on Principles and Applications of Scanning Thermal Microscopy (SThM)," *Adv. Funct. Mater.*, p. 1900892, September 2019, doi: 10.1002/adfm.201900892.

The two common modes of SThM are conductivity contrast mode (active) and temperature contrast mode (passive). In the active mode, the AFM probe is heated by electrical Joule heating or optical heating, and heat flow into the sample causes the temperature of the probe to change, usually measured by electrical resistance or a nano-thermocouple. Passive mode relies on the sample itself to be heated by either Joule or optical means, and then the probe receives a very small amount of heat so that it can electrothermally sense the temperature distribution across the surface. Y. Zhang, W. Zhu, F. Hui, M. Lanza, T. Borca—Tasciuc, and M. Munoz Rojo, "A Review on Principles and Applications of Scanning Thermal Microscopy (SThM)," *Adv. Funct. Mater.*, p. 1900892, September 2019, doi: 10.1002/adfm.201900892; S. Gomes, A. Assy, and P.-O. Chapuis, "Scanning thermal microscopy: A review," *Phys. Status Solidi A*, vol. 212, no. 3, pp. 477-494, 2015, doi: https://doi.org/10.1002/pssa.201400360.

Understanding the thermal pathways in SThM is key to interpreting the collected data. In active mode, heat is typically generated in the probe tip which then conducts heat into both the probe cantilever and into the sample. When the tip and sample are stationary and at steady state, the thermal pathways are stable, but when moving to a new spot on the sample, the thermal pathway into the sample may change, resulting in changes in the probe temperature, current, or resistance. This idea is straightforward, but in practice, many heat transfer mechanisms complicate the process. The mechanisms complicating heat transfer models include, to name a few: (i) conductance of heat via the air (in nonvacuum environments) through a relatively larger area than the actual apex of the tip; (ii) additional thermal relief caused by a condensate layer formed on the tip and sample; (iii) near-field radiative heat transfer; (iv) thermal contact resistance (TCR) at the tip-sample interface, e.g., due to effects of surface roughness and probe tip health; and (v) unsteady convection around the cantilever.

While current SThM techniques have pushed the envelope of our understanding of thermal transport at the nanoscale by providing impactful and digestible qualitative maps of temperature (and thus thermal properties), the ability to quantify thermal properties has been an ongoing challenge for the community. Outstanding issues include the lack of a consistent calibration method between different SThM setups or different material systems, limited sensitivity with regards to the minimum detectable temperature change, complications in understanding the thermal pathways, and poor and limited ability to accurately model the system. The culmination of these and other limitations has prevented the applicability, and thus widespread adoption of SThM as a core nano-thermal metrology technique as compared to the aforementioned thermoreflectance-based methods.

While opto-thermal pump-probe techniques and specialized SPM platforms, such as SThM, have advanced our understanding of nanoscale thermal transport phenomena in the past few decades, each approach also possesses limitations that will impede meaningful application in answering the nano-thermal questions of the future. Thermoreflectance based techniques have the ability to characterize thermal transport across the entire range of observed thermal conductivities and thermal boundary conductances of solids, liquids and their interfaces, however they fall short at answering questions within nanoscale heat transport related to modal-contributions to heat flow due to errors associated with the metal transducer layer, as well as spot-size restrictions due to the diffraction limit. Meanwhile, SThM has enabled the visualization of local thermal property variation at the nanoscale, albeit only down to resolutions of ~100 nm per pixel and in a largely qualitative capacity aside from certain low thermal conductivity systems when it comes to quantification of these properties. Y. Li, N. Mehra, T. Ji, and J. Zhu, "Realizing the nanoscale quantitative thermal mapping of scanning thermal microscopy by resilient tip-surface contact resistance models," *Nanoscale Horiz.*, vol. 3, no. 5, pp. 505-516, August 2018, doi: 10.1039/C8NH00043C.

Accordingly, a need exists for a system and method for performing nanoscale thermal characterization that (i) avoids issues associated with the metal transducer layer in thermoreflectance-based techniques and (ii) provides sub-micron lateral resolution combined with the sensitivity and accuracy to characterize thermal transport properties of materials across the entire range of solids and solid-solid interfaces.

SUMMARY OF THE INVENTION

The present disclosure provides for a system and method that combines the operating principles of thermoreflectance-based and SPM techniques into a hybrid solution that enables reliable thermal property characterization with sub-micron resolution. The disclosed system and method overcomes at least some of the above-described limitations of existing thermoreflectance-based and SThM techniques. As explained in more detail below, the solution of the present disclosure involves the use of an AFM probe as an opto-thermal transducer in a laser-based pump-probe setup. By laser heating the tip of an AFM probe and relying on its contact/thermal pathway with the sample, as opposed to laser heating a thin transducer layer on the sample, the present solution provides a way to decrease the effective spot size of a thermoreflectance measurement to be on the order of the contact radius of the tip-sample interface, on the basis that the tip-sample point of contact provides a physical aperture for heat flow.

In accordance with one embodiment of the present disclosure, system for deriving thermophysical properties of a sample comprises: a tip suspended at a distal end of a cantilever, the tip configured to interact with the sample; a positioning laser source configured to focus a positioning laser beam at a reflective portion of the cantilever; a position-sensitive detector configured to receive the positioning laser beam reflected off of the reflective portion of the cantilever; a pump laser source configured to focus a pump laser beam at the distal end of the cantilever, thereby generating heat in the distal end of the cantilever that flows through the tip and into a region of the sample positioned adjacent to the tip; a probe laser source configured to focus a probe laser beam at a specular surface at the distal end of the cantilever, wherein at least a portion of the probe laser beam is reflected off of the specular surface; and a photodetector configured to receive the probe laser beam reflected off of the specular surface, wherein the reflected probe laser beam comprises thermoreflectance data that can be used to extract thermophysical properties of the sample.

In accordance with at least one embodiment, the tip comprises a hollow pyramidal tip and the specular surface is formed by a metal film coated on exterior surfaces of the hollow pyramidal tip. The probe laser source may be further configured to focus the probe laser beam such that the probe laser beam passes through a basal plane of the hollow pyramidal tip. The metal film may comprise Au, Ag, Al, or Pt.

In accordance with at least one embodiment, the pump laser source is configured to modulate the amplitude of the pump laser beam at a set frequency in order to produce a modulated heat flux into the sample, thereby modulating an intensity of the reflected probe laser beam in correspondence with a temperature oscillation at the specular surface that results due to the modulated heat flux into the sample. The amplitude of the pump laser beam may modulated near a resonant frequency of the cantilever.

In accordance with at least one embodiment, the sample is mounted on a piezoelectric stage configured to iteratively move laterally in X and Y directions such that the system is able to perform a two-dimensional scan of a surface of the sample. The stage may be controlled electronically and configured to use data collected from the position-sensitive detector to adjust a height (Z) of the sample so as to maintain a constant force between the sharp tip and the sample as the stage moves laterally. Each iterative position of the stage may correspond to a pixel of the scan. Each pixel may correspond to an area with a size ranging between 1 nm and 100 nm. The speed of the scan may be between 1 and 100 pixels per second and the resolution of the scan may be between 50 and 500 pixels per lateral axis.

In accordance with at least one embodiment, the photodetector is a balanced photodetector configured to receive the probe laser beam reflected off of the specular surface simultaneously with the position-sensitive detector receiving the positioning laser beam reflected off of the reflective portion of the cantilever.

In accordance with at least one embodiment, the pump laser source and the probe laser source are configured to coaxially align the pump laser beam and the probe laser beam.

In accordance with one embodiment of the present disclosure, the method for deriving thermophysical properties of a sample comprises: positioning a tip above the sample, the tip being suspended at a distal end of a cantilever; focusing, from a positioning laser source, a positioning laser beam at a reflective portion of the cantilever; receiving, at a position-sensitive detector, the positioning laser beam reflected off of the reflective portion of the cantilever; focusing, from a pump laser source, a pump laser beam at the distal end of the cantilever, thereby generating heat in the distal end of the cantilever that flows through the tip and into a region of the sample positioned adjacent to the tip; focusing, from a probe laser source, a probe laser beam at a specular surface at the distal end of the cantilever wherein at least a portion of the probe laser beam is reflected off of specular surface; receiving, at a photodetector, the probe laser beam reflected off of the specular surface, wherein the reflected probe laser beam comprises thermoreflectance data; and extracting, from the thermoreflectance data, thermophysical properties of the sample.

In accordance with at least one embodiment of the method, the tip comprises a hollow pyramidal tip and the specular surface is formed by a metal film coated on exterior surfaces of the hollow pyramidal tip. The probe laser source may focus the probe laser beam such that the probe laser beam passes through a basal plane of the hollow pyramidal tip. The metal film may comprise Au, Ag, Al, or Pt.

In accordance with at least one embodiment of the method, the pump laser source is further configured to modulate the amplitude of the pump laser beam at a set frequency in order to produce a modulated heat flux into the sample, thereby modulating an intensity of the reflected probe laser beam in correspondence with a temperature oscillation at the specular surface that results due to the modulated heat flux into the sample. The amplitude of the pump laser source may be modulated near a resonant frequency of the cantilever.

In accordance with at least one embodiment of the method, the sample is mounted on a piezoelectric stage configured to iteratively move laterally in X and Y directions, the method further comprising performing a two-dimensional scan of a surface of the sample, and wherein the stage is controlled electronically and configured to use data collected from the position-sensitive detector to adjust a height (Z) of the sample so as to maintain a constant force between the sharp tip and the sample as the stage moves laterally. Each iterative position of the stage may correspond to a pixel of the scan. Each pixel may correspond to an area with a size ranging between 1 nm and 100 nm. The speed of the scan may be between 1 and 100 pixels per second and the resolution of the scan may be between 50 and 500 pixels per lateral axis.

In accordance with at least one embodiment of the method, the photodetector is a balanced photodetector configured to receive the probe laser beam reflected off of the specular surface simultaneously with the position-sensitive detector receiving the positioning laser beam reflected off of the reflective portion of the cantilever.

In accordance with at least one embodiment of the method, the pump laser beam and the probe laser beam are coaxially aligned.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 10 shows scan data for various materials systems investigated using a super-resolution thermoreflectance thermal measurement system disclosed and described herein.

DETAILED DESCRIPTION OF THE INVENTION

The present disclosure provides for a system and method that combines the operating principles of thermoreflectance-based and SPM techniques into a hybrid solution that enables reliable thermal property characterization with sub-micron resolution. The disclosed system and method overcomes at least some of the above-described limitations of existing thermoreflectance-based and SPM techniques, such as SThM. As explained in more detail below, the solution of the present disclosure involves the use of an AFM probe as an opto-thermal tip transducer in a laser-based pump-probe setup. By laser heating the tip of an AFM probe and relying on its contact/thermal pathway with the sample, as opposed to laser heating a thin transducer layer on the sample, the present solution provides a way to physically aperture the effective spot size of a thermoreflectance measurement to be on the order of the contact radius between the tip of the AFM probe and the sample. Moreover, without wishing to be bound by theory, by using a comparatively simpler AFM probe without any integrated electrical elements as an opto-thermal tip transducer in an optical pump-probe thermal property measurement system, the thermal modelling can be generalized to a greater extent than possible in existing SThM techniques due to the implementation of consistent boundary conditions related to geometry, materials and heating conditions.

Figure 1:
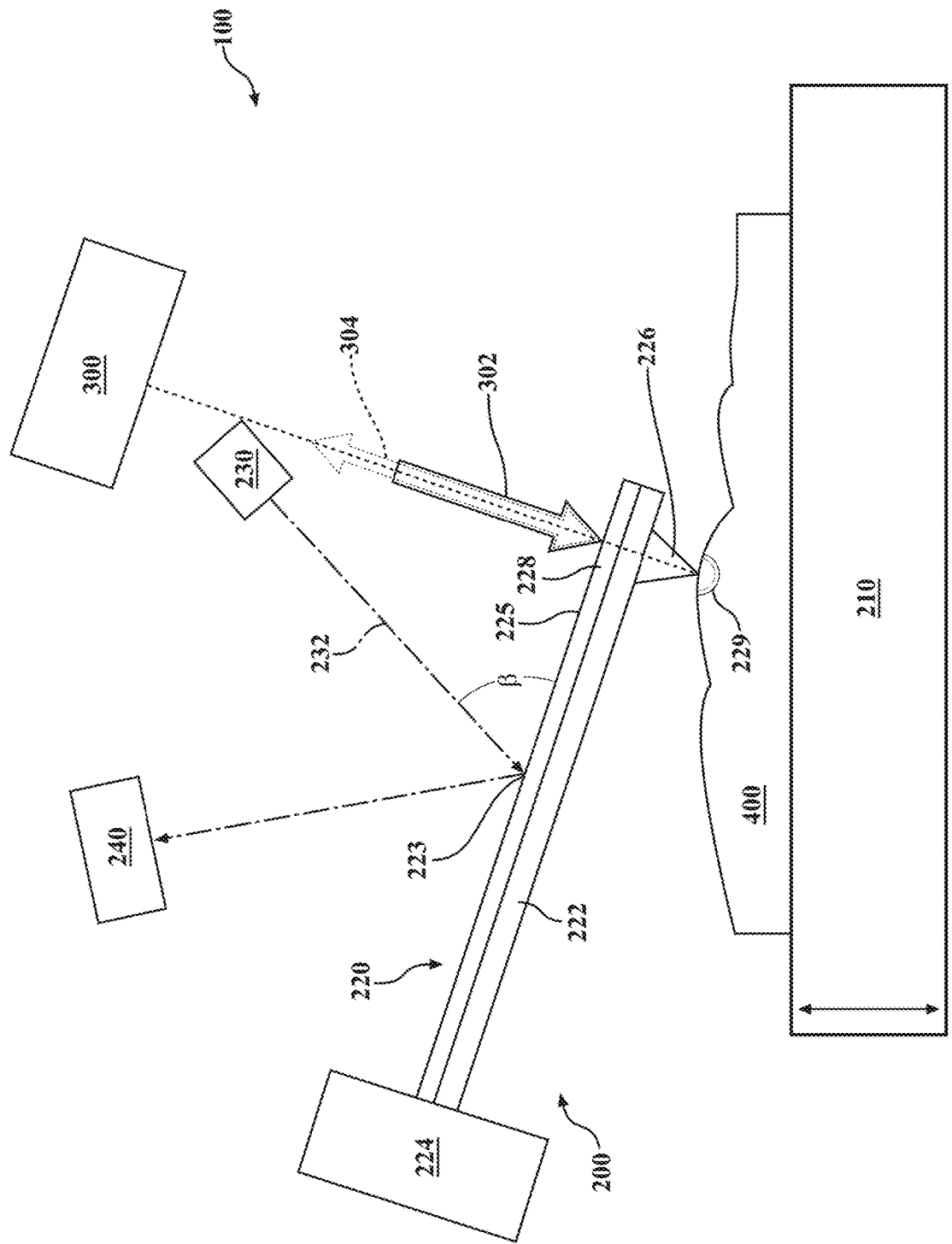
FIG. 1 schematically depicts an embodiment of a super-resolution thermoreflectance thermal measurement system disclosed and described herein.

With reference to FIG. 1, an embodiment of a system 100 for deriving thermophysical properties of a sample 400 is shown. The operating principle of the system 100 hybridizes simple contact mode atomic force microscopy (AFM) for topography and positioning on the sample 400 with thermoreflectance-based techniques for interrogating the thermophysical properties on a pixel-by-pixel basis across the surface of the sample 400. Accordingly, the system 100 integrates a customized AFM platform 200 with a laser system 300 (not shown in FIG. 1) for the extraction of thermophysical properties from the sample 400. In the context of the present disclosure, the term "thermophysical property" refers to either the physical characteristics or thermal properties of a sample. For example, without limitation, a thermophysical property can be heat capacity, thermal conductivity, thermal boundary conductance/resistance, and/or coefficient of thermal expansion. Additionally, a thermophysical property could be a thermal response to an implemented heat flux.

The AFM platform 200 comprises a multi-axis stage 210, the position of which may be controlled by piezoelectric actuators connected thereto (not shown in FIG. 1). Stepper motors may also be used to control the position of the multi-axis stage 210. The sample 400 is mounted to the multi-axis stage 210. The AFM platform 200 further comprises a probe 220 comprising a cantilever 222 having a proximal end connected to a probe holder 224 and a distal end having a tip 226 suspended from the distal end of the cantilever 222 and positioned above the sample 400. The tip 226 configured to interact with the sample 400 such as, for example, to permit the transfer of mechanical and/or thermal energy.

The distal end of the cantilever 222 comprises a specular surface 225 which, in combination with various probe geometries, functions as an opto-thermal tip transducer capable of: (a) absorbing heat from a pump laser that is focused on the specular surface 225 of the cantilever 222; (b) providing a path for this heat to flow down through the tip 226 and to the tip-sample interface for a heat flux 229 to flow into the sample 400; and (c) providing a surface for a probe laser beam to reflect off of carrying thermoreflectance data in terms of the magnitude and phase of the reflected probe laser beam. The thermoreflectance data carried by the reflected probe laser beam corresponds with the thermal resistance of the sample region in the vicinity of the tip 226. In embodiments, the distal end of the cantilever 222 comprises 10% of the cantilever length, 20% of the cantilever length, 30% of the cantilever length, 40% of the cantilever length, 50% of the cantilever length, 60% of the cantilever length, or even 70% of the cantilever length, the cantilever length being the distance between the point at which the cantilever 222 is connected to the probe holder 224 and the most distal point of the distal end of the cantilever 222. In embodiments, the distal end of the cantilever 222 may comprise an opto-thermal tip transducer layer 228 which forms the specular surface 225.

In order to track the deflection of the cantilever 222, the AFM platform 200 may further comprise a positioning laser source 230 configured to focus a positioning laser beam 232 at a reflective portion 223 of the cantilever 222. A position-sensitive detector (PSD) 240 is configured to receive the positioning laser beam 232 that is reflected off of the reflective portion 223 of the cantilever 222.

As the location of and separation distance between the tip 226 and the sample 400 is varied by lateral and vertical piezoelectric actuators of the stage 210, the deflection of the cantilever 222 changes the orientation of the reflective portion 223 of the cantilever 222, and thereby changes the incident angle R between the positioning laser beam 232 and the reflective portion 223. As the incident angle R changes, the reflected positioning laser beam 232 reaches the position-sensitive detector 240 at a different location on the position-sensitive detector 240. In this manner, the position-sensitive detector 240 is able to sense the deflection of the cantilever 222. This information regarding the deflection of the cantilever 222 due to tip-sample interaction is then processed by a digital signal processing (DSP) unit (not shown in FIG. 1) that can either (a) route this information directly to the data acquisition (DAQ) unit (not shown in FIG. 1) to be recorded as height information (constant height mode), or (b) route this information to a closed-loop control unit (not shown in FIG. 1; constant force mode). In constant force mode, a PID feedback loop is used to maintain a constant force between the tip 226 and sample 400, while in constant height mode, the stage 210 is held at a constant height while the deflection of the cantilever 222 is tracked. While operating in either of these two contact modes, additional information regarding the torsion of the cantilever 222 can be recorded, enabling lateral force measurements. Finally, force-distance curves can also be acquired, providing a convenient method to confirm and/or set the tip-sample force prior to executing an image scan.

In embodiments, a pump laser beam 302 and a probe laser beam 304 are focused at the specular surface 225 at the distal end of the cantilever 222. As will be discussed in more detail below, the pump laser beam 302 generates heat in the distal end of the cantilever 222, heat which is routed through the tip 226 to create a heat flux 229 into a region of the sample 400 positioned adjacent to, or below, the tip 226. Depending on the thermal properties of the region of the sample 400 adjacent to, or below, the tip 226, more or less heat will be drawn away from the tip 226 into the sample region, which thereby influences the temperature at the specular surface 225. At least a portion of the probe laser beam 304 is reflected off of the specular surface 225 and returned to the laser system 300 carrying thermoreflectance data in terms of the magnitude and phase of the probe laser beam 304.

Figure 2:
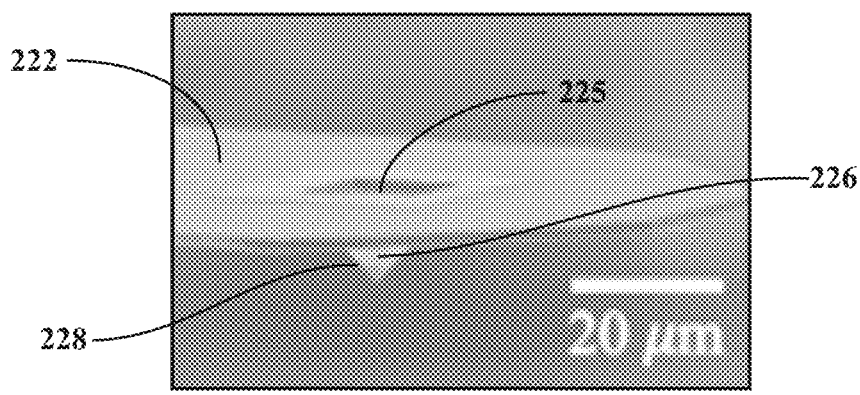
FIG. 2 is a scanning electron microscopy image of the distal end of a cantilever probe according to embodiments disclosed and described herein.
Figure 3:
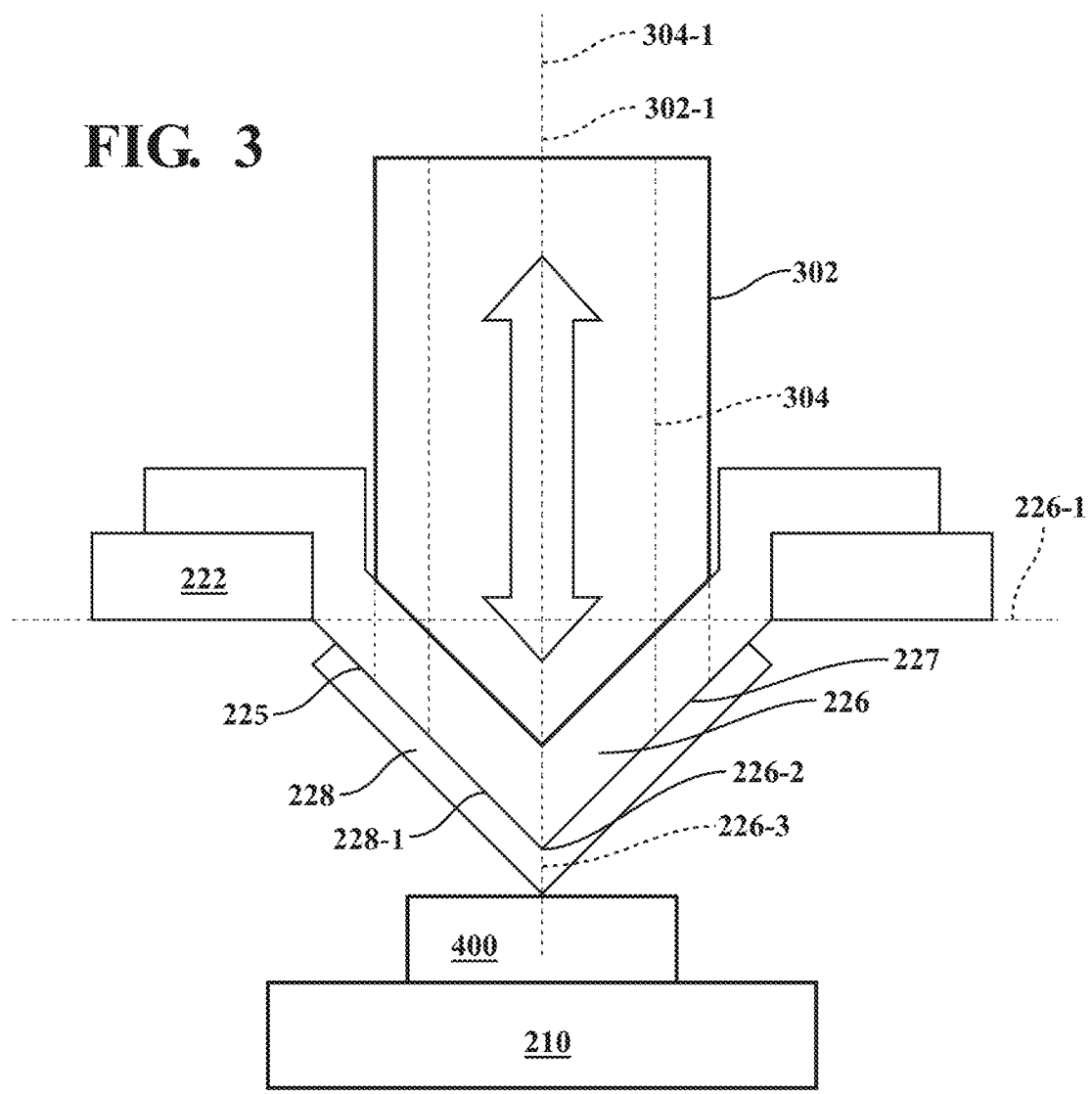
FIG. 3 schematically depicts the distal end of a cantilever probe according to embodiments disclosed and described herein.

In the embodiment shown in FIGS. 2 and 3, the tip 226 is in the form of a hollow pyramidal tip. The hollow pyramidal tip comprises a basal plane 226-1, an apex 226-2, and central axis 226-3 defined by a line passing through the apex 226-2 that extends normal to the basal plane 226-1.

FIG. 2 shows a scanning electron microscopy image of the hollow pyramidal tip suspended from the distal end of the cantilever 222. The cantilever 222 may be made from silicon, silica, silicon nitride, or any other suitable material. The tip 226 may be made from silicon, silica, silicon nitride, diamond-like carbon, diamond, platinum-iridium alloy, or any other suitable material. The reflective portion 223 (not shown in FIG. 2) of the cantilever 222 may comprise a thin film of aluminum, silver, gold, silicon, or any other suitable material. The opto-thermal tip transducer layer 228 may be a thin metal or non-metal film coated on exterior surfaces 227 (shown in FIG. 3) of the hollow pyramidal tip, and may comprise aluminum, silver, gold, platinum, diamond, or any other suitable material. The interior surface 228-1 of the opto-thermal tip transducer layer 228 shown in FIGS. 2 and 3 may form the specular surface 225 discussed above.

In embodiments beyond the hollow pyramidal tip detailed herein and shown in FIGS. 2 and 3, the opto-thermal tip transducer layer 228 may be comprised of alternative geometries and/or materials, with or without a thin metal or non-metal film on an upper surface of the distal end of the cantilever 222, as shown in FIG. 1. In such embodiments, standard AFM probe geometries may be used, for example, where the AFM probe is solid/continuous from the upper surface of the cantilever 222 through the apex 226-2 of the tip 226. The opto-thermal tip transducer layer 228 is capable of being heated by the pump laser beam 302, and the specular surface 225 acts as a reflective surface for the probe laser beam 304. In embodiments, a distinct opto-thermal tip transducer layer is not utilized, such as when the specular surface 228 is merely a surface on the cantilever 222. As discussed above, heat generated by the pump laser beam 302 in the distal end of the cantilever 222 conducts through the tip 226 and into the sample 400. The amount of heat conducted into the sample 400 will be dependent on the local thermal properties of the sample 400, and the magnitude and phase of the reflected probe laser beam 304 will be sensitive to these local thermal properties. In such embodiments, additional AFM probe geometries may be used, e.g., probe geometries not having the hollow pyramidal tip described above.

In the embodiment of the tip 226 of the cantilever 222 shown in FIG. 3, the probe laser beam 304 passes through the basal plane 226-1 of the hollow pyramidal tip before reflecting off of the interior surface 228-1 of the opto-thermal tip transducer layer 228 and then traveling back to the laser system 300 (not shown in FIG. 3). The axis 304-1 of the probe laser beam 304 may be substantially coaxially aligned with the central axis 226-3 of the hollow pyramidal tip. The axis 302-1 of the pump laser beam 302 may also be substantially coaxially aligned with the central axis 226-3 of the hollow pyramidal tip. In the present embodiment, the orientation of the pump and probe laser beams 302, 304 are not simultaneously adjusted with cantilever deflection, hence their "substantial" alignment with the central axis 226-3 of the hollow pyramidal tip. In the embodiment shown in FIG. 3, the pump laser beam 302 and the probe laser beam 304 are coaxially aligned. In other embodiments, the pump laser beam 302 and the probe laser beam 304 may reach the distal end of the cantilever 222 from different directions. In embodiments wherein the pump laser beam 302 and probe laser beam 304 reach the distal end of the cantilever 222 from different directions, the laser system 300 may be configured such that the pump and probe laser beams 302, 304 are independently steered toward the AFM probe 220.

In the embodiment shown in FIG. 1, the pump laser beam 302 and the probe laser beam 304 are coaxially aligned and focused on the specular surface 225 at normal incidence. In other embodiments, the pump laser beam 302 and the probe laser beam 304 may be coaxially aligned and focused on the specular surface 225 at non-normal incidence. In embodiments wherein the pump laser beam 302 and probe laser beam 304 coaxially reach the specular surface 225 at non-normal incidence, the laser system 300 may be configured such that the thermoreflectance data carried by the reflected probe laser beam 304 is collected accordingly by a photodetector.

Figure 4:
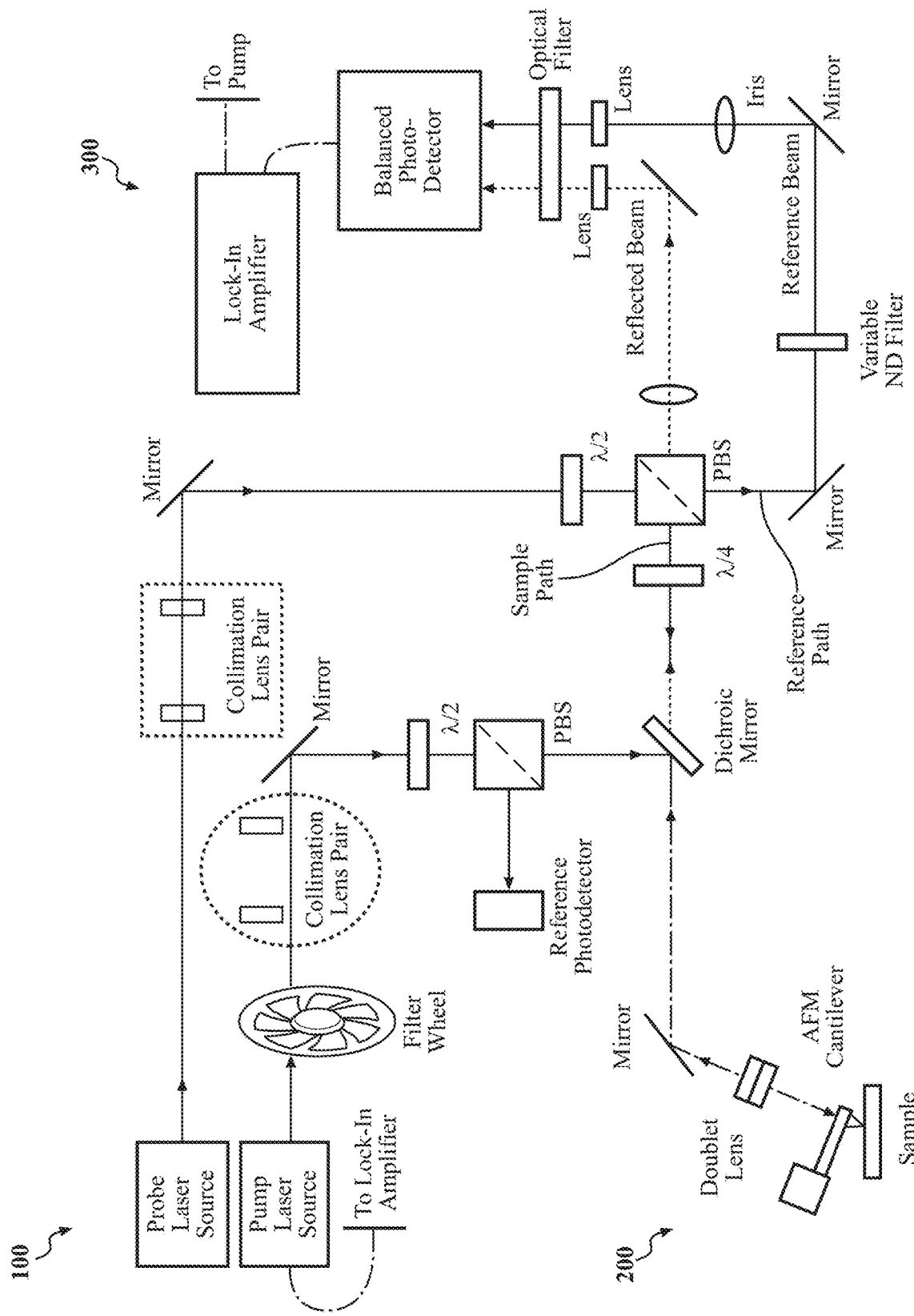
FIG. 4 schematically depicts an embodiment of a laser system used in a super-resolution thermoreflectance thermal measurement system disclosed and described herein.

FIG. 4 shows the system 100 with a detailed schematic of an embodiment of the laser system 300. A pump laser source and a probe laser source are configured to focus the pump laser beam 302 and the probe laser beam 304, respectively, at the specular surface 225 at the distal end of the cantilever 222 of the AFM probe 220. The embodiment shown in FIG. 4 and described herein implements Frequency-Domain Thermoreflectance (FDTR) which, as discussed above, uses either pulsed or continuous-wave (CW) lasers for the pump and probe laser beams. However, it should be noted that TDTR and SSTR systems could also be used in combination with an AFM probe for super-resolution thermoreflectance measurements. The amplitude of the pump laser beam may be frequency modulated using a lock-in amplifier to produce a modulated heat flux into the sample 400. The modulated heat flux induces an associated temperature variation in the distal end of the cantilever, e.g., in opto-thermal tip transducer layer 228, at the modulation frequency. The amplitude of the pump laser beam may be modulated at or near any resonant frequency of the cantilever, both in or out of contact with the sample, as well as any non-resonant frequency of the cantilever-sample mechanical system. The probe laser beam reflects off of the specular surface 225 with its magnitude and phase also varying at the modulation frequency due to changes in the thermoreflectance of the specular surface 225. The characteristics of the thermoreflectance signal, i.e., the magnitude and phase of the reflected portion of the probe laser beam 304, will depend on the thermal properties of the region of the sample 400 in which tip 226 is adjacent to and interacting with. Accordingly, the reflected portion of the probe laser beam comprises frequency-dependent data that may be analyzed to extract thermophysical properties of the sample 400.

With continued reference to FIG. 4, at the exit of the pump laser source is a filter wheel for coarse power adjustment along with a collimation lens pair to manage the pump beam spot size. The paths of the pump laser beam 302 and probe laser beam 304 are routed using mirrors and polarization-based optics such as polarizing beam splitters (PBS) and half and quarter-wave plates (denoted by $\lambda/2$ and $\lambda/4$, respectively). After passing through a collimation lens pair and a half-wave plate, the pump laser beam 302 has a portion of its power split, via a PBS, to a reference photodetector that tracks the power of the pump laser beam 302 and monitors the amplitude-modulated waveform. The probe laser beam 304 passes through a collimation lens pair after exiting the probe laser source, and is then split into reference and sample paths by a separate PBS. Along the sample path for the probe laser beam 304, a quarter-wave plate circularly polarizes the probe laser beam 304. Further along the sample path, the pump and probe laser beams 302, 304 are combined coaxially using a dichroic mirror and are focused on the sample surface by a doublet lens. However, before passing through the doublet lens, a final mirror is used to route the pump and probe laser beams 302, 304 downward toward the AFM probe 220 at normal incidence to the cantilever 222, where they reach the specular surface 225 as described above with reference to FIGS. 1 and 3.

Upon reflecting off the specular surface 225, the reflected portion of the probe laser beam 304 passes through the quarter-wave plate again and is polarized at 90 degrees to its original orientation, allowing it to pass back through the separate PBS. After passing back through the separate PBS, the reflected portion of the probe laser beam 304 passes through an iris, a lens, and an optical filter before arriving at one arm of a balanced photodetector.

The reference path of the probe laser beam 304 is directed through a variable ND filter before passing through an iris, a lens, and the optical filter, and finally arriving at the balanced photodetector. The reference path of the probe laser beam 304 is directed to the other arm of the balanced photodetector to help reduce noise due to power fluctuations of the probe. The irises are used to block beams paths and the variable ND filter is used to adjust the power level of the reference path of the probe laser beam 304. The optical filter blocks any reflected pump laser beam 302 that leaks through the dichroic mirror. The difference signal between the reflected portion of the probe laser beam 304 and the reference path of the probe laser beam 304, upon arrival at the balanced photodetector, is then fed to the lock-in amplifier for extracting the phase and magnitude of the thermoreflectance signal at the pump frequency via homodyne detection.

Software accompanying the system 100 is used to electronically control the multi-axis stage 210. The software is used to control scan parameters (scan range, scan speed, and pixel resolution of the scan region). Scan speeds vary between −0.1 to 100 pixels per second (pps) in one axis; dwell time at each point depends on this setting, although slower or faster scan speeds are possible. The dwell time at each pixel may be adjusted so as to allow the system to reach quasi-steady state heat transfer between the tip 226 and the adjacent region of the sample 400. Scan resolutions of 50 and 500 pixels (px) per axis are used in the present system, although smaller or larger scan resolutions are possible. Strain gages in the stage are used to mitigate drift effects from the piezoelectric translators. The software controls the topography scan and outputs a trigger signal upon stopping at a point to enable simultaneous, external experiments. At each pixel, topographical information is extracted via the AFM probe setup and thermophysical properties are extracted via the laser system 300.

EXAMPLES

The following detailed embodiment illustrates features of the present disclosure, but is not intended to limit the scope of the disclosure. The following detailed embodiment illustrates a working model of a super-resolution thermoreflectance-based thermal measurement system as described above, and further demonstrates the functionality of the disclosed system and method.

For the present detailed embodiment, a customized ThorLabs Educational AFM package was used, specifically, ThorLabs EDU-AFM1(/M) package including all components listed on the package documentation.

In this setup, the frequency modulated pump laser is a 488 nm Coherent OBIS FP 488-LX fiber pigtailed laser (100 mW), and the unmodulated probe laser is a 532 nm Coherent OBIS FP 532-LS fiber pigtailed laser (120 mW). As described above, the reflected portion of the probe laser beam carries a small thermoreflectance signal at the pump modulation frequency due to local temperature oscillation at the specular surface 225. The reflected probe laser beam is routed back to the balanced photodetector, and its differential output signal is fed to a Zurich lock-in amplifier (H2FLI), where demodulators extract the magnitude and phase lag of the thermoreflectance signal relative to the reference drive signal sent by the H2FLI for driving the pump laser beam at a set frequency. The H2FLI has 8 independent oscillators, enabling multiple modulation frequencies to be superimposed in the output signal and allowing the thermoreflectance signal to be demodulated at multiple frequencies simultaneously. Typically, only modulation frequencies over 1 kHz are used to minimize crosstalk with topography data and to improve signal-to-noise by minimizing 1/f noise.

In this example, the photodetector used to detect changes in the thermoreflectance of the specular surface is a balanced photodetector configured to receive both the probe laser beam reflected off of the specular surface, as well as a fraction of the probe beam split by a polarizing beam splitter prior to being routed to the sample (serving as a reference), all collected simultaneously with the position-sensitive detector receiving the positioning laser beam reflected off of the reflective portion of the cantilever. The balanced photodetector of the laser system 300 is a ThorLabs balanced photodetector PDB425A-AC, and the reference photodetector is a ThorLabs DET10A2. It should be noted that the balanced photodetector of the laser system could, in embodiments, be replaced by photodetector employing single-ended detection. That is, a single-ended (non-balanced) detection methodology may also be implemented to detect only the reflected probe beam. However, balanced photodetection enables a lower noise floor in the demodulated signal through lock-in detection. A ThorLabs CCD camera (DC1645C-HQ) (not shown in FIG. 4) may be used as an optional component in the laser system 300. With reference to FIG. 4, a flip mirror (not shown) may be located between the lens and the optical filter along the reflected beam path, and may temporarily redirect the reflected probe beam toward the ThorLabs CCD camera.

For optical routing and beam control, the present detailed embodiment of the system implemented the following specific components (see FIG. 4 for locations of pertinent components below):

Optics:
  Lenses (assorted in ½" and 1" diameters)
    Thorlabs Doublets (assorted); Ex: AC127-050-A-ML
    Thorlabs Plano-Convex Singlets (assorted); Ex: LA1951-A
    Thorlabs Fiber Reflective Collimator; RC04APC-P01
    Thorlabs Fiber Adjustable Aspheric Lens; CFC11A-A
  ND Filters
    Thorlabs 12 Filter Wheel; FW212CNEB
    Thorlabs Absorptive ND Filters; Ex: NE10A
    Thorlabs Variable ND Filter; Ex: NDL-10C-4
  Color/Spectral Filters
    Thorlabs Dichoric mirror; Ex: DLMP505R
    Thorlabs Filterglass; FLH532-10
  Mirrors
    Thorlabs Dielectric Mirrors; BB05-E02, BB1-E02
    Thorlabs Protected Silver Mirrors; PF05-03-P01, PF10-03-P01
  Polarization & Beam Splitters
    Thorlabs Quarter-Waveplates, Quartz; WPQ5M05-532
    Thorlabs Half-Waveplate, Quartz; WPH10M-532
    Thorlabs Polarizing Beamsplitter; CCM1-PBS251
    Thorlabs Pellicle Beamsplitter; CM1-BP108

Optomechanics:
Optical Breadboards & Angle Mounts
  Thorlabs Standard Breadboard; Ex: MB1824
  Thorlabs Double Density Breadboard; Ex: MB612
  Thorlabs Right-Angle Plate; AP90
Optical Post Assemblies
  Thorlabs ½" Optical Posts (assorted sizes); Ex: TR2
  Thorlabs ½" Optical Post Holders (assorted sizes); Ex: PH2
  Thorlabs Slotted Bases; BA1S, BA1R, BA2, BA3, BA4, BA2T2, UPB2
Translation stages
  Thorlabs 1" Translation Stages; XRN25P, XR25P
  Thorlabs X-Y Rotation Stage; XYR1
Lens Mounts
  Thorlabs 2 Adjuster Kinematic mounts; KM05CP, KM100CP, KM100S
  Thorlabs Lens Mount; Ex: LMR1S
  Thorlabs Flip Mounts; FRF90
  Thorlabs Flip Mount Adapter; FM90
  Thorlabs Rectangular Translation Mount; XF50
  Thorlabs Rotation Mounts; LRM1, CRM05
  Thorlabs 6-Axis Kinematic Mount; K6XS
  Thorlabs 5-Axis Kinematic Mount; K5X1
  Thorlabs Z-translation Mount, SM1ZA
  Thorlabs SM05 Lens Tubes (assorted sizes); Ex: SM05L03
  Thorlabs SM1 Lens Tubes (assorted sizes); Ex: SM1L03
  Thorlabs Lens Tube Adapters (assorted); Ex: SM1A6
Cage system components
  Thorlabs Cage plate (assorted sizes); Ex: CP02
  Thorlabs Cage rods (assorted sizes); Ex: ER2

Additional miscellaneous equipment used included BNC to SMA adapters, BNC cables, BNC compatible 50 Ohm shunts, and ferrite cores.

A computer programmed with computer-executable instructions is used to control one or more components of the system and for receiving and processing information. Computer-executable instructions for controlling the pump and probe laser beams and the multi-axis stage according to the herein-described system and method may be stored on a form of computer-readable media. Computer-readable media includes volatile and nonvolatile, removable, and non-removable media implemented in any method or technology for storage of information such as computer-readable instructions, data structures, program modules or other data. Computer-readable media includes, but is not limited to, random access memory (RAM), read-only memory (ROM), electrically erasable programmable ROM (EEPROM), flash memory or other memory technology, compact disk ROM (CD-ROM), digital volatile disks (DVD), or other optical storage, magnetic cassettes, magnetic tape, magnetic disk storage or other magnetic storage devices, or any other medium which can be used to store the desired instructions and which may be accessed by a system (e.g., a computer), including by internet or other computer network form of access.

During a scan, topography and thermoreflectance data are recorded simultaneously. EDU-AFM software collects topography data and outputs a trigger signal when the multi-axis stage moves to the next position (next pixel) on the sample. In the Zurich software interface, LabOne, the data acquisition (DAQ) module waits for incoming trigger signals, and after a short, controlled delay, the thermoreflectance magnitude and phase data are collected for that position. The thermoreflectance data is saved to a file and then processed using a MATLAB script. By observing the timing between trigger inputs, the script maps each data point to a position on a 2D map that directly mirrors the 2D topography map that is output by the EDU-AFM. In addition to thermoreflectance magnitude and phase, the script calculates in- and out-of-phase magnitude and their ratio by converting the polar data at each pixel to rectangular coordinates.

The raw data from EDU-AFM can be post-processed through Gwyddion, a free AFM image processing software, where algorithms such as flattening, line matching, and scar removal can be performed to remove the effects of piezoelectric hysteresis and drift and other artifacts. Typically, topography scans are highly susceptible to artifacts from tip wear, vibrations, and hysteresis, so data generally needs to be post-processed to obtain meaningful topography data on the sample. Height data can also be calibrated and applied to subsequent scans to mitigate error in the topography data. Conversely, the thermoreflectance data is not post-processed to remove artifacts or erroneous data at this point. During initial scans, the "raw" thermoreflectance data has not been as prone to the artifacts seen in its corresponding topography data, while appearing to show greater sensitivity to local properties than the post-processed topography data can yield. Examples of this performance are shown and discussed below in FIGS. 5, 6, 9, and 10. These results demonstrate promise, stability, and utility of the functionality of the super-resolution thermoreflectance measurement system, applying an FDTR measurement modality and method described herein.

The AFM probes used in this work have spanned a range of geometries and materials. While the system of the present disclosure is compatible with most commercial AFM probes, the following ranges are believed to be well-suited for this application: cantilever stiffness: 0.06 N/m to 48 N/m; (typical: 3 N/m); cantilever length: 100 µm to 450 µm; (typical: 250 µm); cantilever width: 20 µm to 50 µm (typical: 40 µm); cantilever thickness: 1 µm to 10 µm; (typical: 3 µm); tip geometry: round cone, pyramidal, spherical, blunt, plateau, flat-top, colloidal; (typical: round cone); tip radius: 10 nm to 2000 nm; (typical: 50 nm).

The following probes have been successfully used: (i) ContAl-G and ContGD-G standard sharp tip silicon probes with relatively long cantilevers (~450 µm by 50 µm by 2 µm), a force constant of 0.2 N/m, and a ~13 kHz natural frequency and an aluminum (ContAl-G) or gold (ContGD-G) reflex coating from BudgetSensors; (ii) specialized PNP-DB probes from NanoWorld® with a pyrex chip and a pyramidal, silicon nitride (SiN) tips were also used; these probes were 200 µm long by 40 µm wide and 500 nm thick and had a force constant of 0.06 N/m and a natural resonance around ~17 kHz with a gold reflex coating; and (iii) three sizes of the Biosphere™ Nano-Indenting (NI) AFM probes with spherical tips from NanoTools were used. The NI probes have 400 µm by 50 µm by 2 µm silicon cantilevers with a gold reflex coating and tips made of diamond-like carbon (DLC) and radii of 20, 300, and 2000 nm. The natural frequency of these probes was roughly ~13 kHz, and they had a spring constant of 0.2 N/m. All AFM probes used have had gold or aluminum reflex coatings on the upper surface of the cantilever to act as a mirror for the PSD laser and as an opto-thermal transducer for implementation of FDTR in this example. The results indicate that each AFM probe is able to provide ample thermoreflectance sensitivity under the appropriate operating conditions (here, proper FDTR laser powers, modulation frequencies and beam alignment), regardless of tip geometry or probe material, implying the utility and versatility of the disclosed super-resolution thermoreflectance system for application with samples of a wide range of material properties.

Operating ranges for various aspects of the system and method of the present disclosure are provided below in Table 1.

TABLE 1

Operating Ranges

| Control Parameter | Range | Typical |
|---|---|---|
| Optical Pump Power | 10 µW to 10 mW | 1 mW |
| Optical Probe Power | 10 µW to 4 mW | 1 mW |
| AFM Positioning Laser Power | 0.10 mW to 2.5 mW | 2.0 mW (635 nm) |
| AFM Probe Deflection Offset | 0.010 V to 3 V | 0.100 V |
| AFM Probe Contact Force | 10 nN to 10 µN | 100 nN |
| Scan Range (single axis) | 10 nm to 20 µm | 1 µm |
| Pixel Resolution (single axis) | 50 px to 500 px | 100 px |
| Scan speed | 0.1 to 100 px/s | 50 px/s |
| Averaged Topography Data Points | 1 to 10 | 10 |
| Resolvable Topographical Height Range | 1 nm to 12 µm | 10 nm |
| Pump Modulation Frequency | 100 Hz to 10 MHz | 1 to 60 kHz |
| Averaging Time Constant | 100 µs to 100 ms | 3 ms |
| Pixel Dwell Time | 10 ms to 10 s | 20 ms |
| Collection Delay (from trigger edge) | 2 ms to 500 ms | 12 ms |
| Averaged Data Points | 1 pt to 1000 pt | 10 pt |

Figure 5:
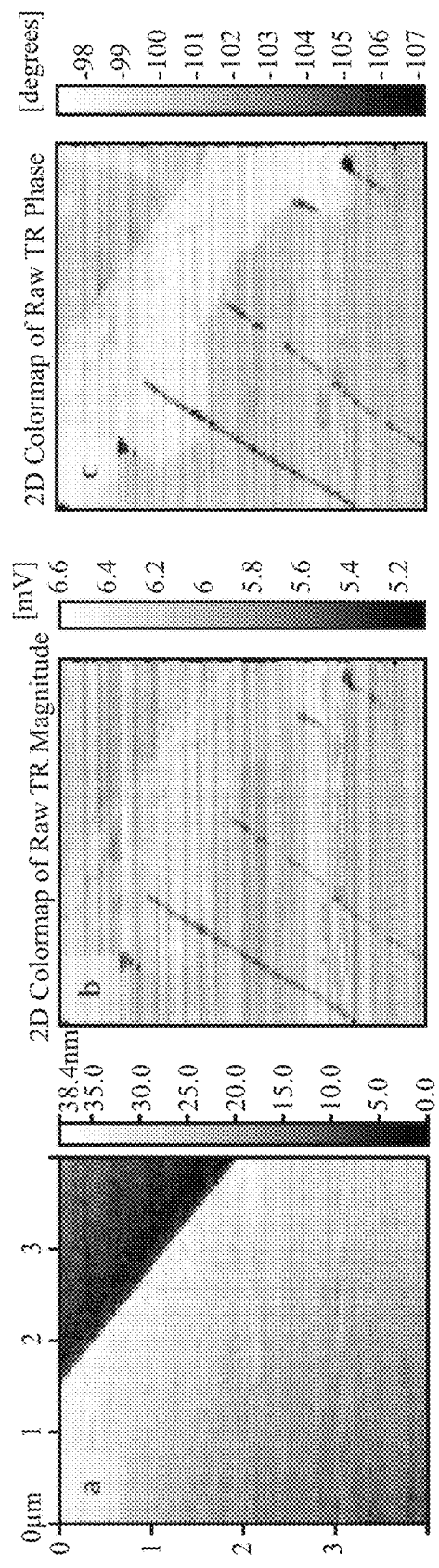
FIG. 5 is a set of images taken during a 10 kHz (off-resonance) scan of single-layer graphene on SiC using a super-resolution thermoreflectance thermal measurement system disclosed and described herein, showing post-processed topography, thermoreflectance magnitude, and thermoreflectance phase.

When operating the pump laser beam at a given modulation frequency, scan data has shown that the thermoreflectance signal typically varies slightly in magnitude and phase of the locked-in signal. This behavior is shown in FIG. 5, which shows scan results for a 4×4 µm$^2$, 100×100 px$^2$ scan using a SiN pyramidal probe on single-layer epitaxially grown graphene (epi-graphene) on silicon carbide (SiC) using a pump modulation frequency of 10 kHz (a non-resonant frequency of the cantilever/sample system). In particular, FIG. 5 shows (a) the post-processed topography, (b) thermoreflectance magnitude (in mV), and (c) thermoreflectance phase (in degrees) of the single-layer epitaxially grown graphene on SiC. These results shows that the magnitude and phase of the reflected probe laser beam vary spatially depending on the position of the cantilever tip relative to the sample surface, indicating that the temperature of the specular surface, e.g., formed by an opto-thermal tip transducer layer, varies based on the local thermal relief pathway (i.e., local properties of the sample). The simultaneous topography scan demonstrates a step terrace in the SiC substrate, commonly found in epi-grown graphene. At this feature, the topography shows a sudden drop in sample surface height, while the thermoreflectance data (especially the phase) shows where there may be multiple layers of graphene just before the terrace, which is not visible in the topographical data. Additionally, the long, dark streaks in the thermoreflectance maps are hypothesized to be areas where the epi-graphene did not fully close and the SiC substrate is exposed (another common defect in epi-graphene on SiC), the SiC having very different thermal and mechanical properties. The exposed SiC is also not visible in the post processed topography, indicating that the topography difference between the neighboring graphene and exposed SiC is very small.

Figure 7A:
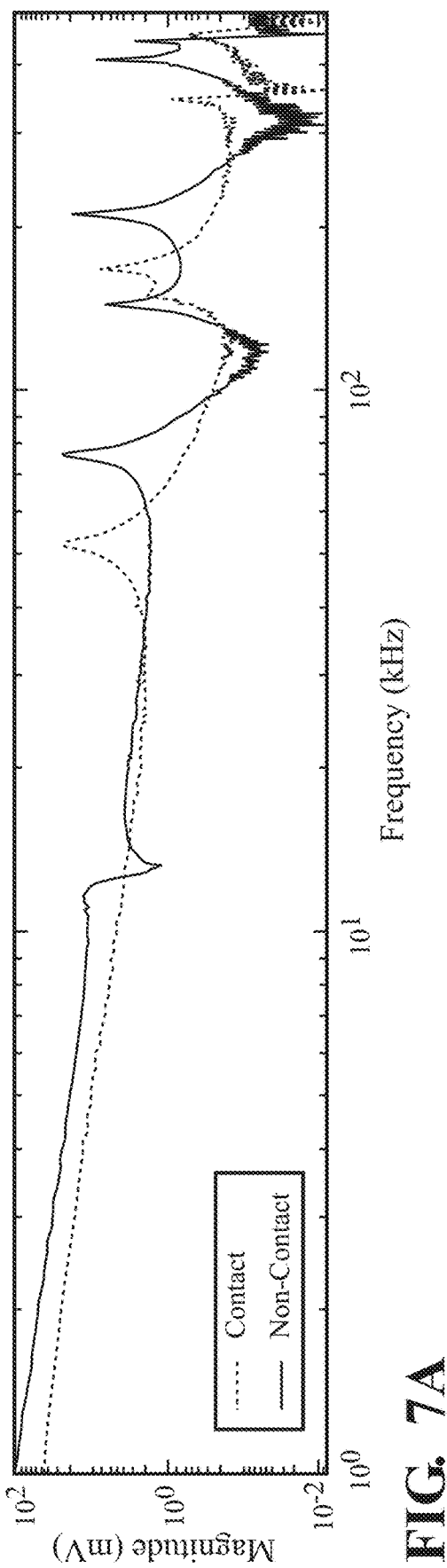
FIGS. 7A-7B are plots showing the thermoreflectance magnitude and thermoreflectance phase, respectively, taken during a 1 to 500 kHz frequency sweep, showing multiple resonant modes of the cantilever.
Figure 7B:
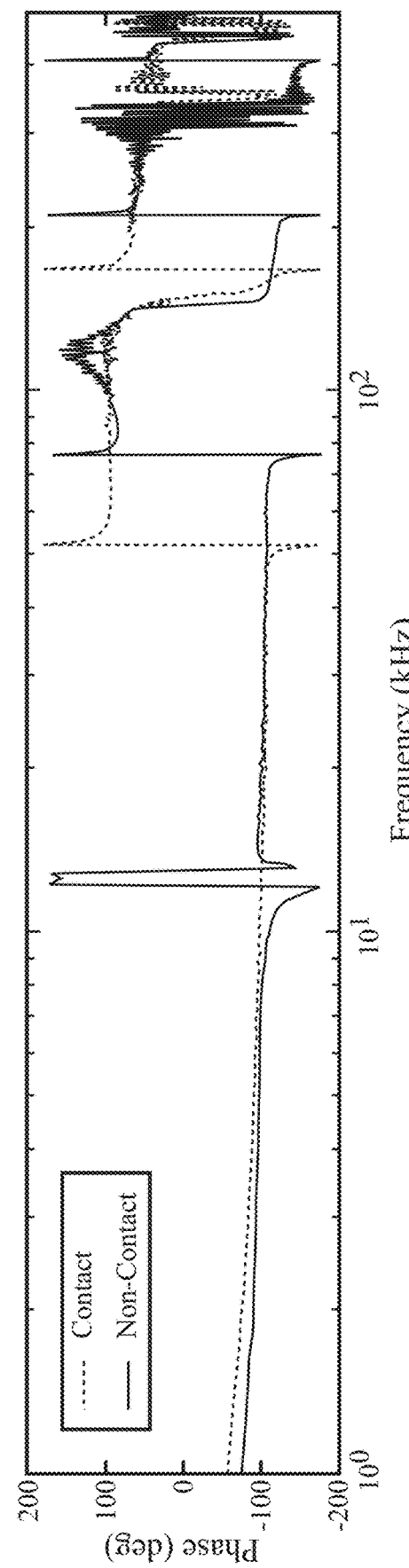

It was discovered that that by varying the pump laser beam modulation frequency, the magnitude and phase of the thermoreflectance signal reflected off the AFM probe varies as well. This behavior was somewhat expected as the thermal response of the system should be dependent on the effective thermal transfer function in the frequency domain of the sample and heating time of the sample area being heated/probed by the frequency-modulated pump and unmodulated probe. This behavior drives the thermal sensitivity in FDTR and its subsequent thermal model and solution that enables the characterization of thermal properties, including thermal conductivity, as described by Schmidt et al. It was further discovered that by sweeping the modulation frequency from 1 kHz to 500 kHz, the mechanical natural frequencies of the AFM cantilever in contact with the sample surface are observable based on the pump modulation frequency, as seen in FIGS. 7A-7B. This behavior is believed to arise due to the coupling between the mechanical and thermal behavior of the cantilever (acoustic phonons are responsible for the bulk of the heat transfer in a solid material). Moreover, the oscillating temperature of the cantilever will induce an oscillating thermal expansion and contraction at the same frequency. For the soft cantilevers used, the cantilever will typically have a free natural resonance between −12 to 18 kHz when it is not in contact with a sample, based on its material and geometry. When the tip is engaged with the sample, the first resonance moves to roughly four times the free resonant frequency, typically between 50 to 75 kHz. Higher resonant modes are observable typically around ~170 kHz and beyond when in contact with a sample. These mechanical resonance behaviors are well observed in AFM literature related to contact resonance microscopy. H.-J. Butt, B. Cappella, and M. Kappl, "Force measurements with the atomic force microscope: Technique, interpretation and applications," *Surf Sci. Rep.*, vol. 59, no. 1, pp. 1-152, 2005, doi: https://doi.org/10.1016/j.surfrep 0.2005.08.003.

Figure 8A:
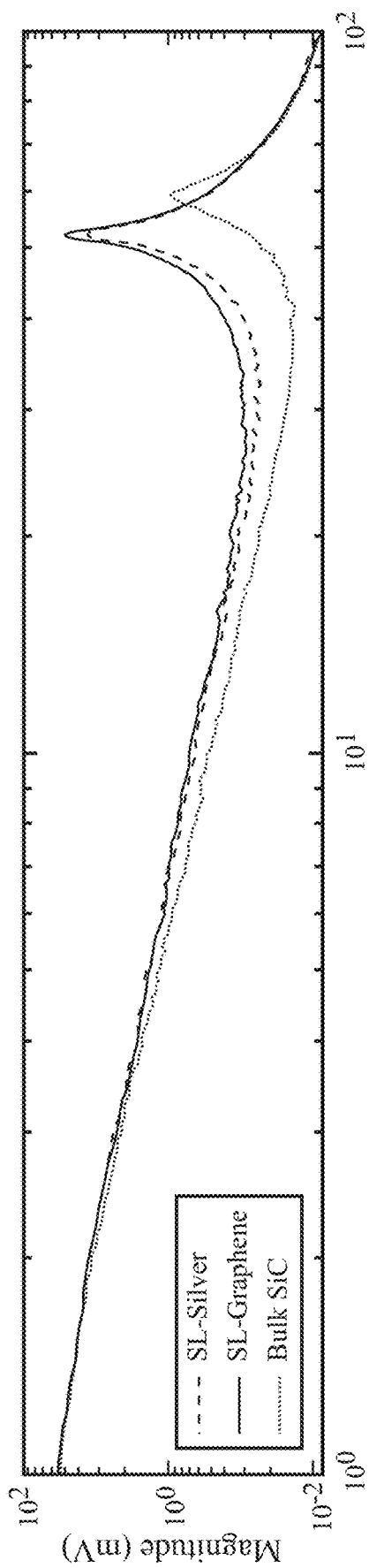
FIGS. 8A-8B are plots showing the thermoreflectance magnitude and thermoreflectance phase, respectively, taken during a 1 to 100 kHz frequency sweep, comparing a mode of cantilever resonance for different sample materials.
Figure 8B:
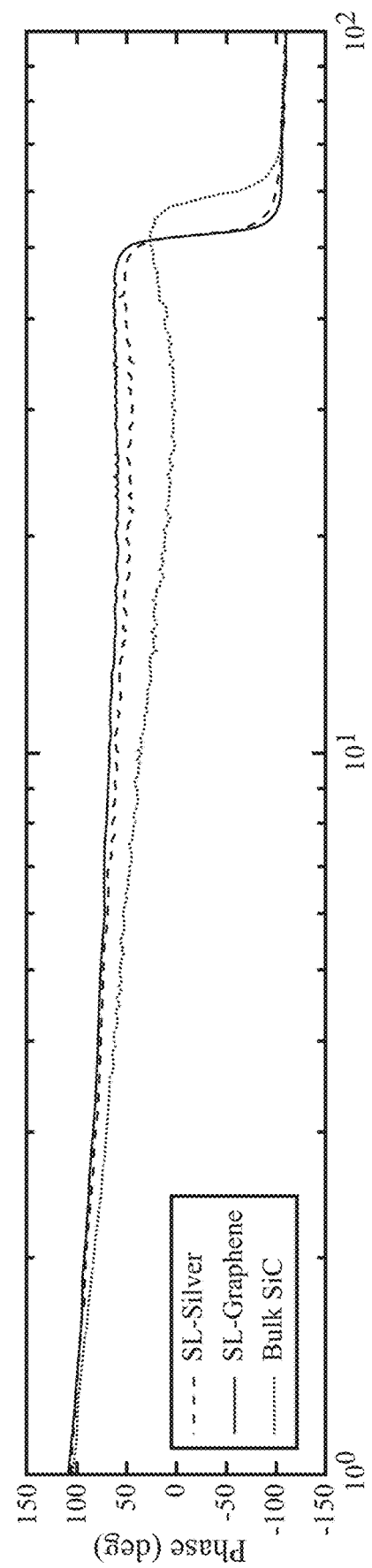

It was further discovered that the frequency-dependence of the resonant behavior of the cantilever varies based on what material the tip of the cantilever is in contact with. FIG. 8 demonstrates the first resonant peak behavior utilizing the same probe (and power conditions) on three different materials: bulk SiC, single layer epi-graphene on SiC, and graphene-encapsulated single layer silver (atomically thin to few layers) grown on SiC through confinement heteroepitaxy (CHet). The frequency shift of the resonant peak is visible in the data for each sample, accompanied by changes in the resonance quality factor (the width in frequency space and its shape factor) and overall behavior in both magnitude and frequency. SiC demonstrates the lowest magnitude and highest frequency peak, while both SL-Graphene and SL-Silver have similar frequency resonant peaks with similar shapes and magnitudes, which is expected as graphene is present at the surface in both of these samples. The broadening and reduction in magnitude of the SL-Silver peak demonstrates sensitivity to as little as 1-3 monolayers of silver contained between the SiC substrate and epi-graphene overlayer. This comparison is instructive to the system's utility due to the similarities among the three samples in question; that is, SiC only, SiC/epi-graphene, or SiC/2D-Ag/epi-graphene. The dramatic change between the SiC and SL-Graphene curves is theorized to be a result of one or more of the following factors: (a) the change in contact stiffness at the tip-sample interface, especially near resonance, (b) the weak bonding between the substrate and the single to few layers of graphene (depending on proximity to a defect), or (c) the inability for the graphene to pass heat through-plane (into the substrate) adding a thermal offset to the mechanical resonance amplitude due to an increase the local temperature in the sample and cantilever. See Butt et al. and H. J. Sharahi, M. Janmaleki, L. Tetard, S. Kim, H. Sadeghian, and G. J. Verbiest, "Acoustic subsurfaceatomic force microscopy: Three-dimensional imaging at the nanoscale," J. Appl. Phys., vol. 129, no. 3, p. 030901, January 2021, doi: 10.1063/5.0035151.

Along with the finding that the mechanical resonances of the AFM cantilever can be excited thermally via the modulated heat flux deposited by the pump laser beam, it was found that by modulating the pump laser beam at a frequency near the natural resonant frequency of the cantilever when the cantilever tip is in contact with the sample, sharper contrast can be obtained in the resulting thermoreflectance maps of both magnitude and phase, with a wider range of magnitude and phase shift between different areas on the sample. The resulting sharper contrast can be seen in FIG. 6, which shows results from a repeat scan of the same area shown in FIG. 5, except at a modulation frequency of 51 kHz scan (near-resonance centered around 52 kHz) instead of 10 kHz (off-resonance). Accordingly, in some embodiments, the pump laser beam is frequency modulated at or near a resonant frequency of the cantilever.

Figure 6:
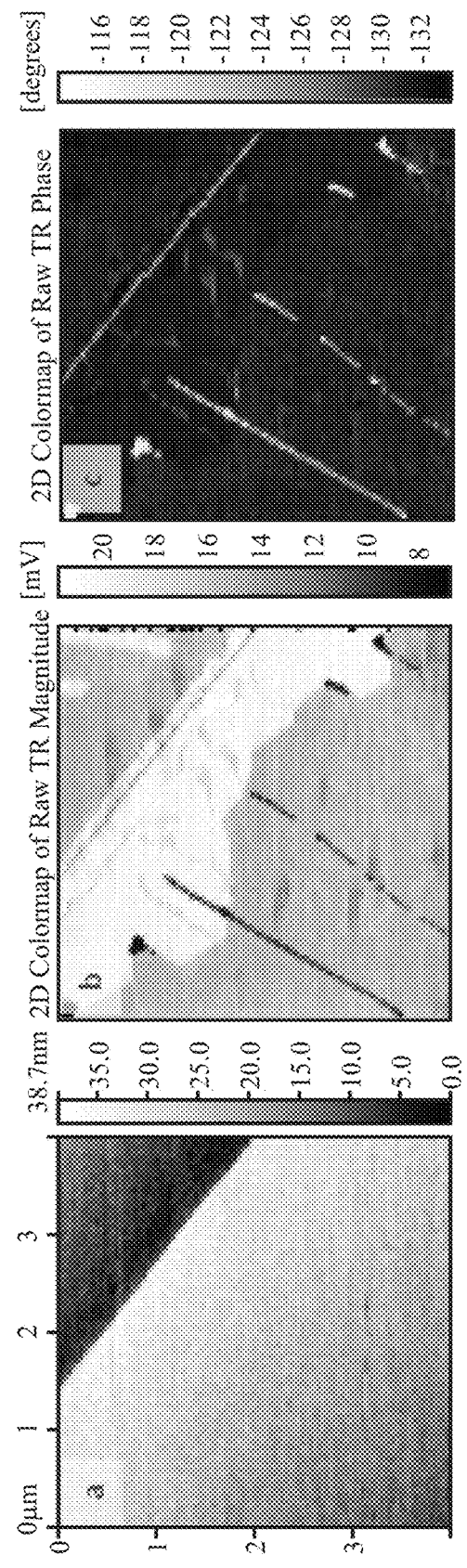
FIG. 6 is a set of images taken during a 51 kHz (near-resonance) scan of single-layer graphene on SiC using a super-resolution thermoreflectance thermal measurement system disclosed and described herein, showing post-processed topography, thermoreflectance magnitude, and thermoreflectance phase.

In FIG. 6, nuances in the sample surface structure are more visible in the thermoreflectance data than in FIG. 5, while the collected topography data is unaffected by the change in pump modulation frequency. In FIG. 6, defects in the hypothesized multilayer region of graphene, where perhaps lines of single layer graphene exist (based on the magnitude of the regions far from the terrace), are more visible. Furthermore, the phase of the thermoreflectance on the exposed SiC behaves inversely of what is observed in the 10 kHz scan (i.e. the SiC now exhibits a more positive relative phase to graphene than the more negative phase in the 10 kHz scan; this behavior is attributed to the difference in resonance peak position and shape between SiC and graphene, shown in FIG. 8). Higher modes of resonance tend to behave similarly, yielding increased thermoreflectance sensitivity in the form of larger magnitude and phase shifts during scans.

Figure 9:
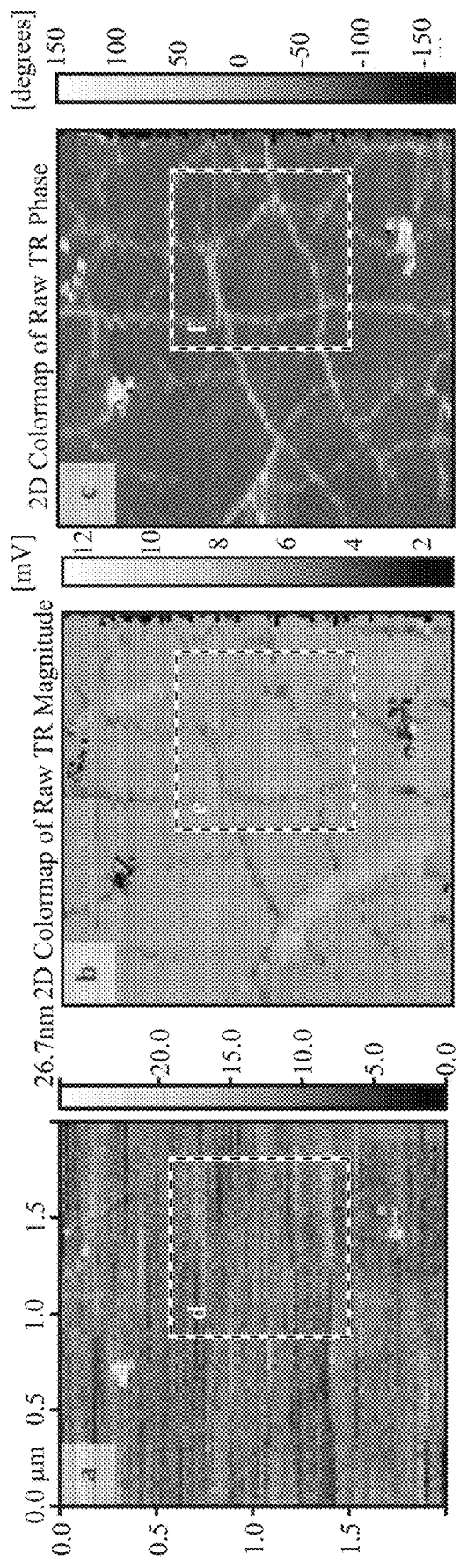
FIG. 9 is a set of images showing topography, thermoreflectance magnitude, and thermoreflectance phase from a scan of graphene-encapsulated 2D silver at a modulation frequency of 170 kHz (on-resonance) using a SiN pyramidal tip probe.
Figure 9:
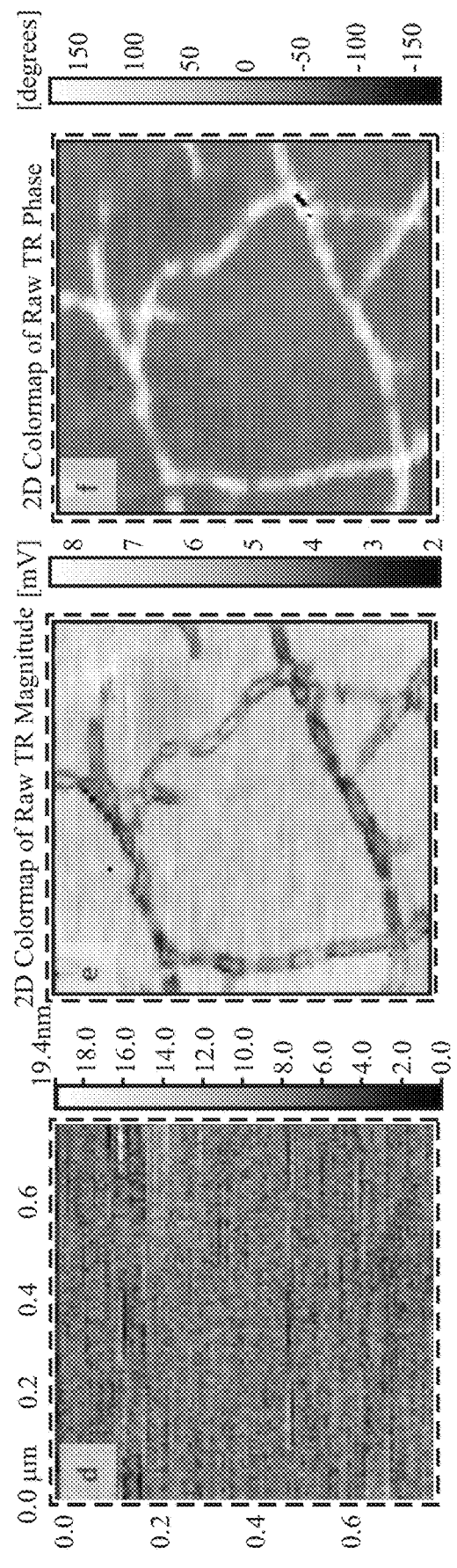

Looking further at the data from the CHet-grown 2D-Ag sample, the thermoreflectance maps again show significantly higher local property sensitivity and contrast than that seen in the topography data. FIG. 9 shows a comparison of a large region and a subset region on the sample. In particular, the data shown in FIG. 9 corresponds to a scan of graphene-encapsulated 2D silver at a modulation frequency of 170 kHz (on-resonance) using a SiN pyramical tip probe for a (a-c) 2×2 µm$^2$ (100×100 px$^2$ scan area) and (d-f) 2×2 µm 2 (100×100 px$^2$ scan area), wherein images (a) and (d) are post-processed topography; (b) and (e) show the thermoreflectance magnitude in mV; and (c) and (f) show the thermoreflectance phase in degrees. Here, the topography data yields relatively flat data with the exception of some surface defects, but the thermoreflectance data reveals much more; not only does it show the surface defects shown in the topography, but it shows large roadmap-like crack features not shown in the topography. These cracks are characteristic to how graphene-encapsulated atomically thin silver grown via CHet forms due to discontinuities during the intercalation process at small step edges on the bulk SiC surface. N. Briggs et al., "Epitaxial graphene/silicon carbide intercalation: a minireview on graphene modulation and unique 2D materials," Nanoscale, vol. 11, no. 33, pp. 15440-15447, 2019, doi: 10.1039/C9NR03721G. Zooming in further on the cracks illustrates that there may be more to glean from this small scale about the thermal properties near these boundaries.

Thermoreflectance Measurements on Other Material Systems

In order to demonstrate the robustness of the system and method disclosed herein, several other material systems were explored, as detailed in FIG. 10.

Among the more standard materials tested are bulk calcium fluoride ($CaF_2$), an amorphous silicon dioxide (a-$SiO_2$) thin-film grown on silicon, and n-doped bulk silicon (n-Si). These scans show that even in common thin film and bulk materials, there may be local property variations that the disclosed thermoreflectance signal is sensitive to, potentially due to defects like twin-boundaries and/or light-induced clusters of line defects in $CaF_2$ or vacancies or dopants in n-Si. In the case of a-$SiO_2$, the increased sensitivity is perhaps due to local bonding structure and short-range vibrational energy carriers in amorphous materials (locons, diffusons, and propagons). See W.-X. Zhou, Y. Cheng, K.-Q. Chen, G. Xie, T. Wang, and G. Zhang, "Thermal Conductivity of Amorphous Materials," Adv. Funct. Mater., vol. 30, no. 8, p. 1903829, 2020, doi 10.1002/adfm.201903829 and J. M. Larkin and A. J. H. McGaughey, "Thermal conductivity accumulation in amorphous silica and amorphous silicon," Phys. Rev. B, vol. 89, no. 14, p. 144303, April 2014, doi: 10.1103/PhysRevB.89.144303.

Aside from the epi-graphene and the atomically thin silver samples discussed previously, data have been collected for other novel materials including phononic metalattices and cold-sintered ceramics. The phononic metalattice shown here is a periodic structure of 60 nm radius beads of silica ($SiO_2$) that was infiltrated with alumina ($Al_2O_3$), wherein some defects in the ordering of the spheres can be seen for the chosen scan region. The metalattice structure leads to what are called "meta-atoms" and "meta-bonds," and based on the close-packed structure the network forms, it is hypothesized that the bright and dark spots next to the spheres in the thermoreflectance maps correspond to either the meta-atoms or meta-bonds. In the cold-sintered ceramic, individual grains of ceramic material are easily visualized in topography and thermoreflectance data. Additionally, some of the intergranular areas appear to show thermoreflectance signal that may be indicative of polymeric material that was included within this cold sintered composition to tune its dielectric properties.

Each of these materials have provided important insight related to the operation of the system, aiding in its development while providing anecdotal indications that this platform can be applied to a wide variety of material systems and structures. Through the work conducted on all materials investigated to date, additional insight related to the operation of the system and the adjustable parameters available to the use include the following:

Beam power compatibility with AFM probe material. Higher thermal conductivity probes can withstand and may require higher pump and probe powers to provide enough signal to extract thermoreflectance data.

Beam alignment and position on cantilever. Coaxial beam alignment may provide higher thermoreflectance signals, and the position on the tip appears to affect the portion of heat that flows up the shank (cantilever into the chip) versus into the sample, thus affecting thermoreflectance sensitivity and signal-to-noise. Beam quality affects the collected data. It appears that aperturing the reflected probe beam may help provide an enhancement of the thermoreflectance signal, likely due to distortion of the probe beam due to clipping (hard aperturing) upstream.

Scan rate and timing. Scanning too fast may not allow for enough dwell time for the system to reach a quasi-steady state (e.g., thermoreflectance is still changing by the time the system moves to the next pixel). Improved data quality (qualitatively determined by colormap results) can be achieved by optimizing settings in LabOne, including the data collection delay and duration after the trigger signal, the quantity of thermal data points collected, and the averaging time constant.

AFM tip-sample force and cantilever deflection. Tip-sample force appears to impact the frequency and amplitude of resonant behavior, as well as the thermoreflectance signal amplitude in off-resonance operation. Additionally, large changes in cantilever deflection, such as those at sharp topographical edges, may affect the quality of the collected data.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system for deriving thermophysical properties of a sample, the system comprising:
    a tip suspended at a distal end of a cantilever, the tip configured to interact with the sample;
    a positioning laser source configured to focus a positioning laser beam at a reflective portion of the cantilever;
    a position-sensitive detector configured to receive the positioning laser beam reflected off of the reflective portion of the cantilever;
    a pump laser source configured to focus a pump laser beam at the distal end of the cantilever, thereby generating heat in the distal end of the cantilever that flows through the tip and into a region of the sample positioned adjacent to the tip;
    a probe laser source configured to focus a probe laser beam at a specular surface at the distal end of the cantilever, wherein at least a portion of the probe laser beam is reflected off of the specular surface; and
    a photodetector configured to receive the probe laser beam reflected off of the specular surface, wherein the reflected probe laser beam comprises thermoreflectance data that can be used to extract thermophysical properties of the sample.

2. The system of claim 1, wherein the tip comprises a hollow pyramidal tip, and wherein the specular surface is formed by a metal film coated on exterior surfaces of the hollow pyramidal tip.

3. The system of claim 2, wherein the probe laser source is further configured to focus the probe laser beam such that the probe laser beam passes through a basal plane of the hollow pyramidal tip.

4. The system of claim 2, wherein the metal film comprises Au, Ag, Al, or Pt.

5. The system of claim 1, wherein the pump laser source is further configured to modulate an amplitude of the pump laser beam at a set frequency in order to produce a modulated heat flux into the sample, thereby modulating an intensity of the reflected probe laser beam in correspondence with a temperature oscillation at the specular surface that results due to the modulated heat flux into the sample.

6. The system of claim 1, wherein an amplitude of the pump laser beam is modulated near a resonant frequency of the cantilever.

7. The system of claim 1, wherein the sample is mounted on a piezoelectric stage configured to iteratively move laterally in X and Y directions such that the system is able to perform a two-dimensional scan of a surface of the sample, and wherein the stage is controlled electronically and configured to use data collected from the position-sensitive detector to adjust a height (Z) of the sample so as to maintain a constant force between the tip and the sample as the stage moves laterally.

8. The system of claim 7, wherein:
each iterative position of the stage corresponds to a pixel of the scan;
each pixel corresponds to an area with a size ranging between 1 nm and 100 nm;
a speed of the scan is between 1 and 100 pixels per second; and
a resolution of the scan is between 50 and 500 pixels per lateral axis.

9. The system of claim 1, wherein the photodetector is a balanced photodetector configured to receive the probe laser beam reflected off of the specular surface simultaneously with the position-sensitive detector receiving the positioning laser beam reflected off of the reflective portion of the cantilever.

10. The system of claim 1, wherein the pump laser source and the probe laser source are configured to coaxially align the pump laser beam and the probe laser beam.

11. A method for deriving thermophysical properties of a sample, the method comprising:
positioning a tip above the sample, the tip being suspended at a distal end of a cantilever;
focusing, from a positioning laser source, a positioning laser beam at a reflective portion of the cantilever;
receiving, at a position-sensitive detector, the positioning laser beam reflected off of the reflective portion of the cantilever;
focusing, from a pump laser source, a pump laser beam at the distal end of the cantilever, thereby generating heat in the distal end of the cantilever that flows through the tip and into a region of the sample positioned adjacent to the tip;
focusing, from a probe laser source, a probe laser beam at a specular surface at the distal end of the cantilever wherein at least a portion of the probe laser beam is reflected off of the specular surface;
receiving, at a photodetector, the probe laser beam reflected off of the specular surface, wherein the reflected probe laser beam comprises thermoreflectance data; and
extracting, from the thermoreflectance data, thermophysical properties of the sample.

12. The method of claim 11, wherein the tip comprises a hollow pyramidal tip, and wherein the specular surface is formed by a metal film coated on exterior surfaces of the hollow pyramidal tip.

13. The method of claim 12, wherein the probe laser source focuses the probe laser beam such that the probe laser beam passes through a basal plane of the hollow pyramidal tip.

14. The method of claim 12, wherein the metal film comprises Au, Ag, Al, or Pt.

15. The method of claim 11, wherein the pump laser source is further configured to modulate an amplitude of the pump laser beam at a set frequency in order to produce a modulated heat flux into the sample, thereby modulating an intensity of the reflected probe laser beam in correspondence with a temperature oscillation at the specular surface that results due to the modulated heat flux into the sample.

16. The method of claim 11, wherein an amplitude of the pump laser source is modulated near a resonant frequency of the cantilever.

17. The method of claim 11, wherein the sample is mounted on a piezoelectric stage configured to iteratively move laterally in X and Y directions, the method further comprising performing a two-dimensional scan of a surface of the sample, and wherein the stage is controlled electronically and configured to use data collected from the position-sensitive detector to adjust a height (Z) of the sample so as to maintain a constant force between the tip and the sample as the stage moves laterally.

18. The method of claim 17, wherein:
each iterative position of the stage corresponds to a pixel of the scan;
each pixel corresponds to an area with a size ranging between 1 nm and 100 nm;
a speed of the scan is between 1 and 100 pixels per second; and
a resolution of the scan is between 50 and 500 pixels per lateral axis.

19. The method of claim 11, wherein the photodetector is a balanced photodetector configured to receive the probe laser beam reflected off of the specular surface simultaneously with the position-sensitive detector receiving the positioning laser beam reflected off of the reflective portion of the cantilever.

20. The method of claim 11, wherein the pump laser beam and the probe laser beam are coaxially aligned.

* * * * *